United States Patent [19]
Toyoda

[11] Patent Number: 6,064,827
[45] Date of Patent: *May 16, 2000

[54] IMAGE STABILIZER

[75] Inventor: Yasuhiro Toyoda, Ohmiya, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/076,107

[22] Filed: May 12, 1998

[30] Foreign Application Priority Data

| May 16, 1997 | [JP] | Japan | ................................ 9-141127 |
| Jun. 16, 1997 | [JP] | Japan | ................................ 9-172760 |

[51] Int. Cl.[7] .......................... G03B 17/00; G02B 27/64
[52] U.S. Cl. ........................................................ 396/55
[58] Field of Search ............................ 396/55; 348/208; 359/554, 557

[56] References Cited

U.S. PATENT DOCUMENTS

| 5,598,246 | 1/1997 | Miyamoto et al. | ...................... 396/55 |
| 5,610,678 | 3/1997 | Tsuboi et al. | ........................ 396/373 |
| 5,659,806 | 8/1997 | Miyamoto et al. | ...................... 396/55 |
| 5,745,802 | 4/1998 | Imura | ..................................... 396/55 |

FOREIGN PATENT DOCUMENTS

| 63-155038 | 6/1988 | Japan . |
| 3-188430 | 8/1991 | Japan . |
| 5-297443 | 11/1993 | Japan . |
| 7-294975 | 11/1995 | Japan . |

Primary Examiner—W. B. Perkey
Attorney, Agent, or Firm—Fitzpatrick, Cella, Harper & Scinto

[57] ABSTRACT

An image stabilizer including a movable frame that moves in a plane perpendicular to an optical axis to correct image blurring and has a first surface perpendicular to the optical axis and a support frame for movably supporting the movable frame in the plane perpendicular to the optical axis. The support frame includes a predetermined member having a second surface perpendicular to the optical axis and a ball arranged between the first surface and the second surface. The support frame movably supports the movable frame in a plane perpendicular to the optical axis with the ball kept in rolling contact with the first and second surface. The image stabilizer thus suffers small resistance in the shifting movement.

25 Claims, 12 Drawing Sheets

IMAGE STABILIZER

BACKGROUND OF THE INVENTION

1. Field of the Invention

The present invention relates to an image stabilizer for correcting image blurring arising from camera shake in cameras and other optical apparatuses.

2. Description of the Related Art

A mechanism for shifting some lenses of a lens unit constituting an imaging lens in perpendicular to the optical axis of the imaging lens is incorporated in a vibration-proof optical system for controlling image blurring in a camera. Image blurring is predicted by detecting acceleration of the camera resulting from camera shake and the imaging lens is shifted in perpendicular to the optical axis of the lens in response to the prediction.

In such a lens shifting mechanism, as disclosed in Japanese Patent Laid-Open No. 3-188430, camera shake is resolved into a component in the horizontal direction of the camera (hereinafter referred to as yaw direction) and a component in the vertical direction of the camera (hereinafter referred to as pitch direction), and an image-blurring correction shift lens (hereinafter simply referred to as a correction lens) slides in both the yaw direction and pitch directions with the aid of a guide bar and bearings or with the aide of slide plates mutually sliding to each other so that the correction lens is shifted in the yaw direction and the pitch direction mutually independently without any displacement in the direction of the optical axis.

Japanese Patent Laid-Open No. 63-155038 discloses a mechanism in which a correction lens is supported by a four-joint parallel link with its rotation about the optical axis restrained. The movement of the four-joint parallel link in the optical axis direction is absorbed by a guide and a spring so that the movement of the link does not affect the correction lens, and the correction lens is urged against a reference surface by the spring with the aid of a ball.

Japanese Patent Laid-Open No. 5-297443 discloses a mechanism in which, besides a member that restrains the rotation of a correction lens about the optical axis, at least three supports such as balls are provided between a support frame and the correction lens. Pressure means is used to urge the correction lens. The correction lens is shifted so that it keeps reliably its upright position to the optical axis.

Japanese Patent Laid-Open No. 7-294975 discloses a mechanism in which a correction lens is moved back and forth independently in an X axis (yaw) and a Y axis (pitch) by feed screws. In this mechanism, a roller is arranged between a correction lens frame and a movable member so that the correction lens is shifted in all directions. A ball under the urging of a spring is arranged between the correction lens frame and a base so that the correction lens may not be inclined.

Besides these disclosures, it is contemplated that a correction lens is put back to its initial position by the balance of a plurality of spring members with the restoring force of each spring member (helical tension spring) used as means for restraining the rotation of the correction lens about its optical axis.

The above-cited Japanese Patent Laid-Open No. 3-188430 has two disadvantages: one is that a great frictional resistance in sliding the sliding plates requires large energy that is used to generate electromagnetic force required for shifting the correction lens and the other is that, strictly speaking, a slight looseness in the engagement of the guide bar and the bearing causes the correction lens to be displaced in the direction of the optical axis.

In the above-cited Japanese Patent Laid-Open No. 63-155038, a looseness takes place between the optical axis and the vertical direction of the mechanism because a lens barrel and a ring member are loosely engaged with each other. During the driving of the mechanism, a frictional resistance takes place in the engagement portion, canceling the merit of the hinge portion of the link having a small frictional resistance and the ball having also a small frictional resistance. The use of the coordinated support of the four-joint parallel link and ball makes the mechanism complex, increases the component count of the mechanism, and pushes up the cost of the mechanism. In this disclosure, the shift mechanism in one direction only is proposed. Even if the same mechanism is additionally arranged for the vertical direction as well, a shifting of the lens in a slant direction is difficult to perform because of the structure of the four-joint parallel link.

In the above-cited Japanese Patent Laid-Open No. 5-297443, the means for restraining the rotation of the correction lens about the optical axis is the sliding motion acting between the guide bar and the bearing and between an elongated slot and a pin. Frictional resistance here is not small enough. Besides the means for restraining the rotation of the correction lens about the optical axis, at least three balls and the pressure means are employed, making the mechanism complex, increasing the component count of the mechanism, and pushing the cost of the mechanism.

In the above-cited Japanese Patent Laid-Open No. 7-294975, a frictional resistance is generated between the guide of the movable member and a guide shaft, and the roller between the correction lens frame and the movable member generates rolling friction resistance, and the overall resistance generated against shifting the correction lens is thus substantial. The addition of the support mechanism of the ball makes the mechanism complex, increases its component count and pushes up its cost.

In the mechanism which employs the restoring force of the spring member (helical tension spring) and the balance of the plurality of springs, an electromagnetic force driving unit shoulders the load of the spring members during the driving of the correction lens. The more the shift of the correction lens the greater the load shouldered by the driving unit. To precisely position control the shifting of the correction lens, the electromagnetic force driving unit must output a larger force. For this reason, the driving unit is bulky in size and needs more energy.

SUMMARY OF THE INVENTION

In one aspect, the image stabilizer of the present invention which moves in a plane perpendicular to an optical axis to correct image blurring, comprises movable means having a first surface perpendicular to the optical axis, and support means for movably supporting the movable means in the plane perpendicular to the optical axis, the support means comprising a predetermined member having a second surface perpendicular to the optical axis, and a ball arranged between the first surface and the second surface, wherein the support means movably supports the movable means in a plane perpendicular to the optical axis with the ball kept in rolling contact with the first and second surface.

DESCRIPTION OF THE PREFERRED EMBODIMENTS

First Embodiment

Figure 1:
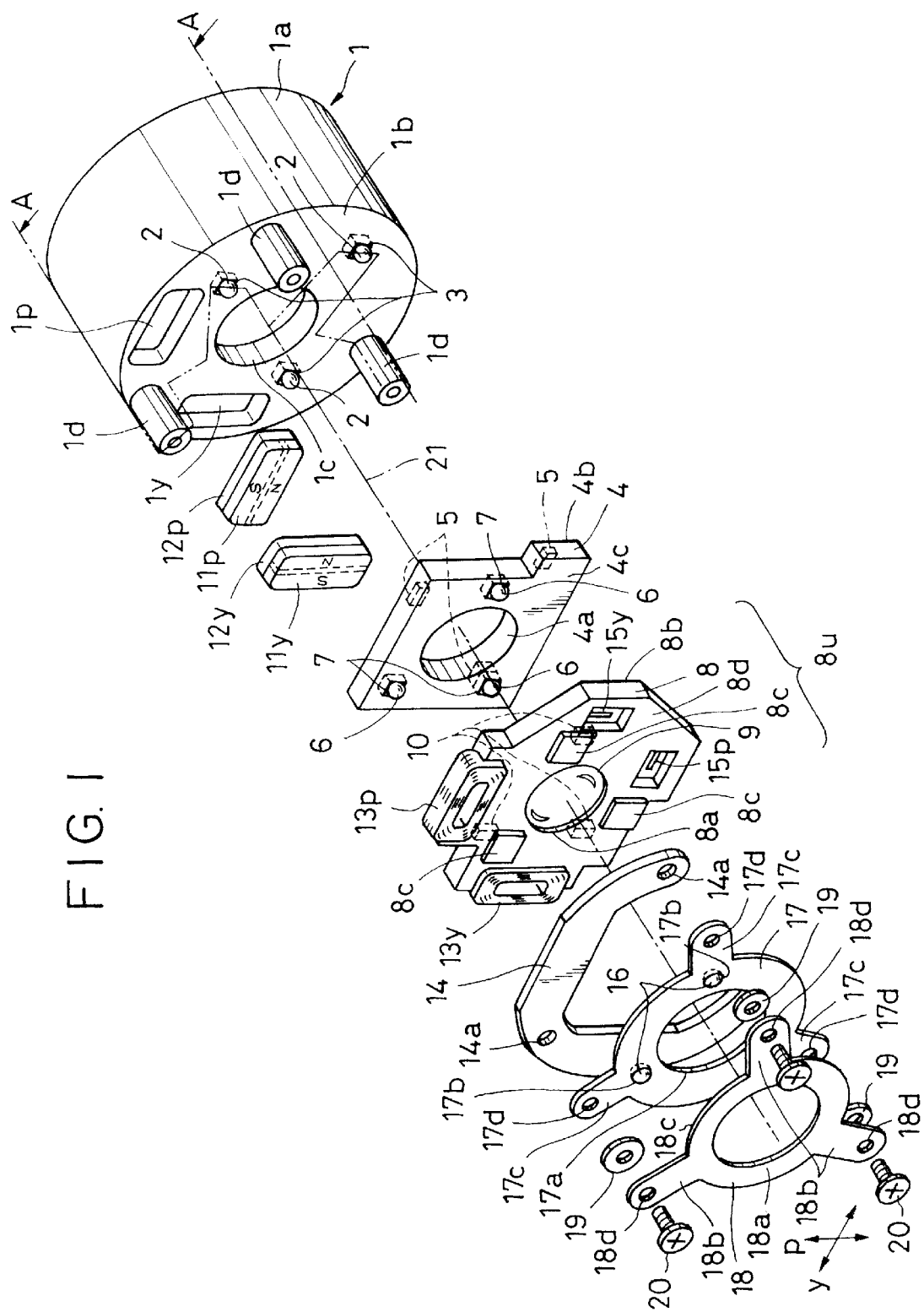
FIG. 1 is an exploded perspective view of a lens shift mechanism of a first embodiment of the present invention.
Figure 2:
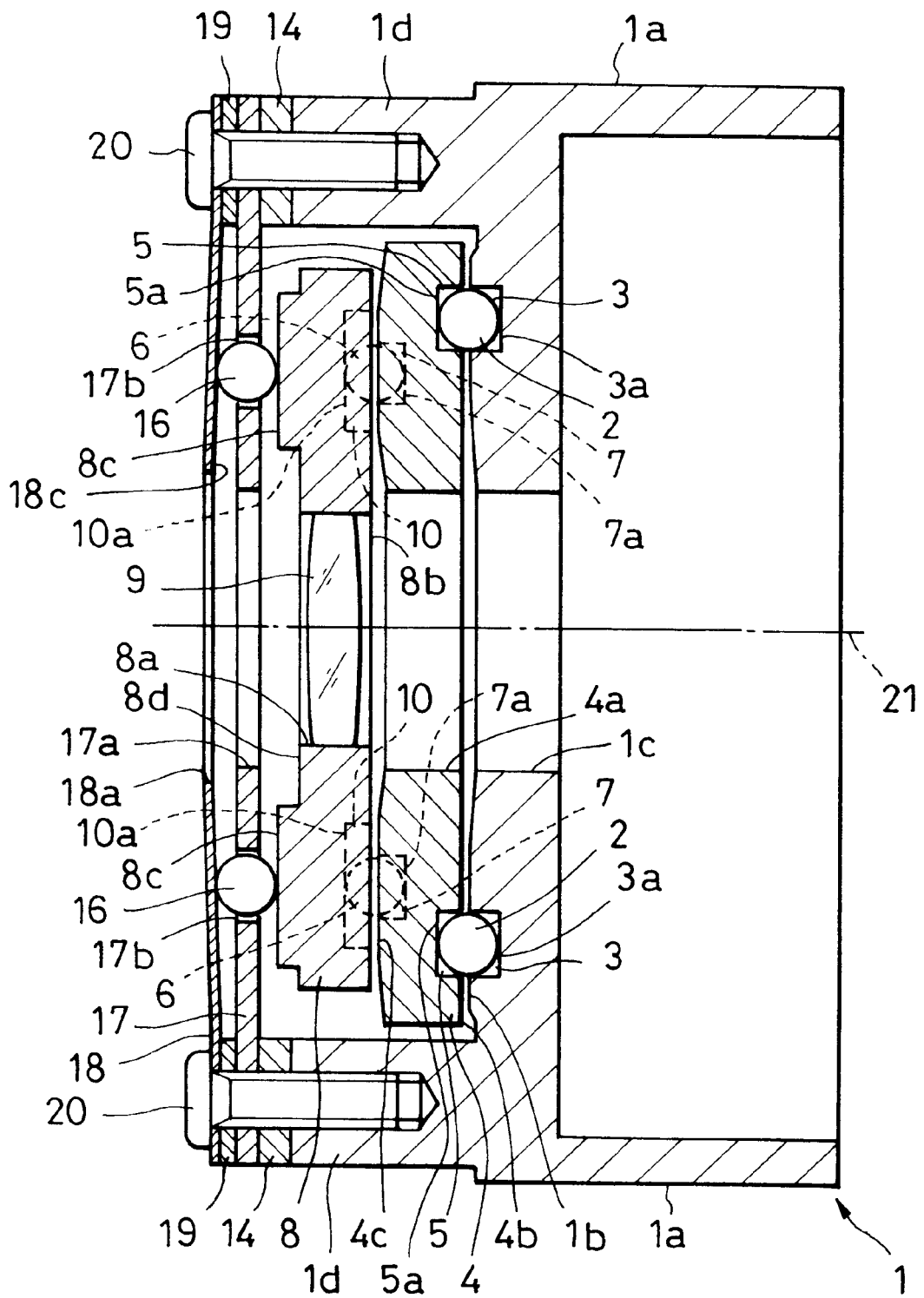
FIG. 2 is a cross-sectional view of the lens shift mechanism taken along a line A—A in FIG. 1.
Figure 3:
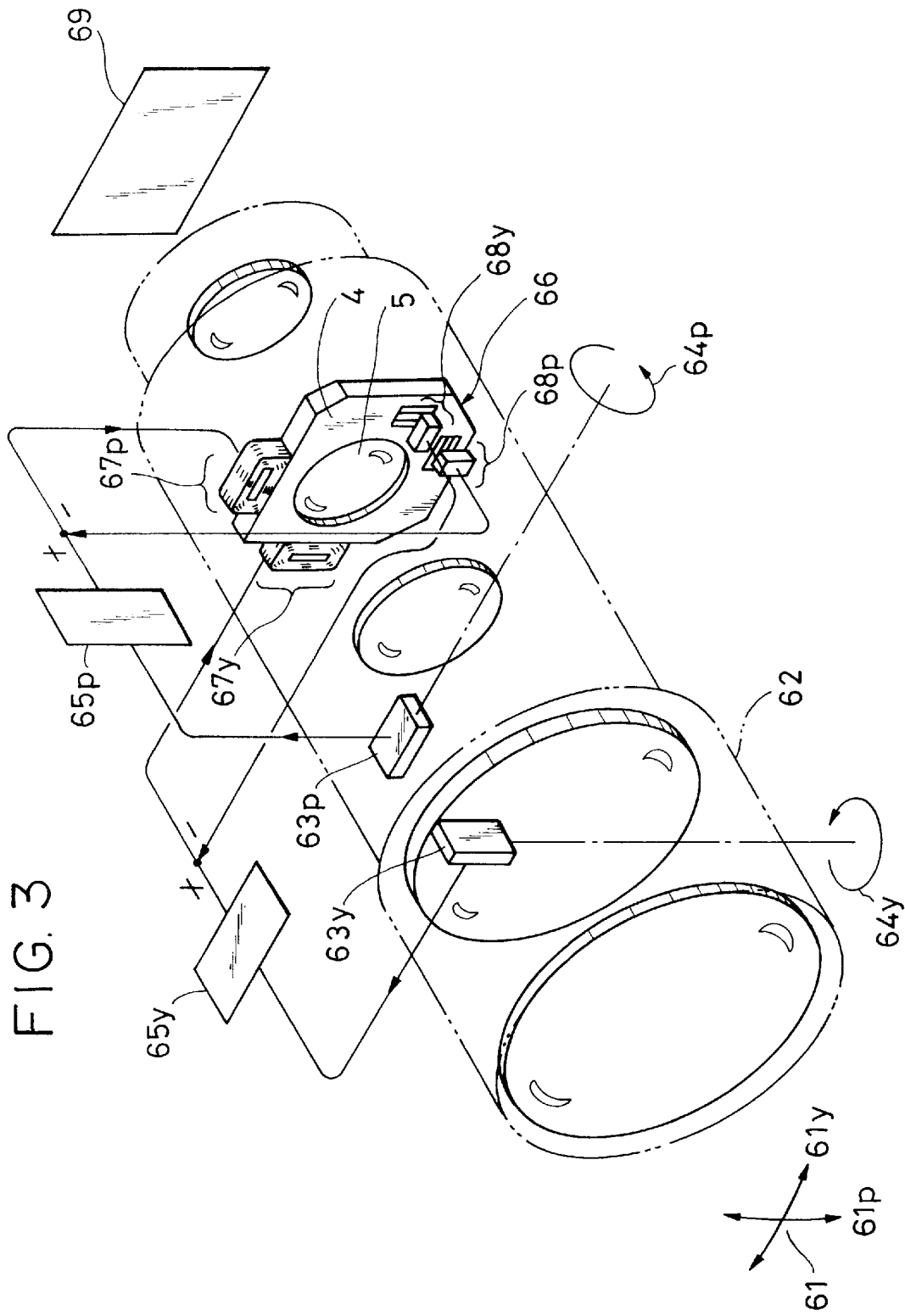
FIG. 3 is a perspective view showing generally a typical vibration-proof system.

Referring to the drawings, the embodiments of the present invention are now discussed. FIG. 1 is an exploded perspective view of a lens shift mechanism of a first embodiment of the present invention. FIG. 2 is a cross-sectional view of the lens shift mechanism taken along a line A—A in FIG. 1. FIG. 3 is a perspective view showing generally a typical vibration-proof system.

Referring to FIG. 3, an image stabilizer (vibration-proof system) incorporating an angular displacement detector as a vibration sensor is discussed.

FIG. 3 shows the system for controlling image blurring resulting from the vertical component 61p and horizontal component 61y of camera shake represented by arrows 61.

Shown in FIG. 3 are a lens barrel 62 having an imaging optical system, and angular displacement detectors 63p and 63y for detecting respectively the vertical angular displacement and horizontal angular displacement of the camera vibration, and 64p and 64y denote respectively the directions of angular displacement. Arithmetic circuits 65p and 65y compute drive desired-value signals for a correction lens shift mechanism 66 based on the signals from the angular displacement detectors 63p and 63y. In response to the drive desired-value signals, the correction lens shift mechanism 66 (including drive units 67p and 67y and shift position sensors 68p and 68y) operates to stabilize an image on an image plane 69.

The correction lens shift mechanism 66 shown in FIGS. 1 and 2 is now discussed.

A support frame 1 on its outer circumference 1a is engaged with an unshown lens barrel and is supported such that the support frame 1 moves in the direction of the optical axis only. The front end face 1b of the support frame 1 has in its center an opening 1c that allows an image light flux to pass therethrough. Designated 2 are three first support steel balls (hereinafter referred to as a first ball set). First ball holders 3 are regularly spaced an angle of about 120° apart around the opening 1c and support the respective three balls of the first ball set in a manner that allows each ball to roll therewithin. The first ball holders 3 hold the respective balls such that the most forward points, in the direction of the optical axis, of the three balls lie in a plane perpendicular to the optical axis and are projected from the front end face 1b. The first ball holders 3 are integrally formed with the support frame 1. Reference surfaces 3a are perpendicular to the optical axis (see FIG. 2), and form the bottom surfaces of the first ball holders 3 so that the first ball set 2 remains reliably in contact therewith. Since the three balls of the first ball set have the same diameter in the first embodiment, the three reference surfaces 3a lie in the same plane. If the diameters of the balls are set to be different, the reference surfaces 3a lie in a plurality of different planes.

A guide plate member 4 has in its center an opening 4a that allows the image light flux to pass therethrough, and has, on its rear end face 4b, first grooves 5 running by a length enough to cover a predetermined shift with a sufficient margin in the yaw direction y, in positions corresponding to the respective balls of the first ball set 2. The first grooves 5 have bottom surfaces 5a, intended to be reliably in contact with the first ball set 2, in parallel with and facing the respective reference surfaces 3a (see FIG. 2). The width across each first groove 5 is designed such that a clearance between the groove walls and each ball is minimized. The first ball set 2 guides the guide plate member 4 along the first grooves 5 in the yaw direction y. A spacing between the support frame 1 and the guide plate member 4 accommodating the first ball set 2 is hereinafter referred to as a first clearance.

In the first embodiment, the most forward points, in the direction of the optical axis, of the three balls of the first ball set 2 lie in one plane perpendicular to the optical axis; thus, the surfaces 5a lie in the same plane. If the most forward points, in the direction of the optical axis, of the three balls of the first ball set 2 do not line in one plane perpendicular to the optical axis, and are different in position in the direction of the optical axis, the surfaces 5a lie in a plurality of different planes perpendicular to the optical axis in accordance with the most forward points, in the direction of the optical axis, of the three balls of the first ball set 2.

Designated 6 are three second support steel balls (hereinafter referred to as a second ball set). Three second ball holders 7 are regularly spaced an angle of about 120° apart around the opening 4a and respectively support the three balls of the second ball set in a manner that allows each ball to roll therewithin. The second ball holders 7 hold the respective balls such that the most forward points, in the direction of the optical axis, of the three balls lie in a plane perpendicular to the optical axis and are projected from the front end face 4c of the guide plate member 4. The second ball holders 7 are integrally formed with the guide plate member 4. Surfaces 7a are perpendicular to the optical axis (see FIG. 2) and parallel with the reference surfaces 3a, and form the bottom surfaces of the second ball holders 7 so that the second ball set 6 remains reliably in contact therewith. Since the three balls of the second ball set have the same diameter in the first embodiment, the three surfaces 7a lie in the same plane. If the diameters of the balls are set to be different, the surfaces 7a lie in a plurality of different planes.

A movable frame 8 has in its center an opening 8a for holding a correction lens 9, and on its rear end face 8b, second grooves 10 running by a length enough to cover a predetermined shift with a sufficient margin in the pitch direction p, in positions corresponding to the respective balls of the second ball set 6. The second grooves 10 have bottom surfaces 10a, intended to be reliably in contact with the second ball set 6, in parallel with and facing the respective surfaces 7a (in parallel with the reference surfaces 3a as well) (see FIG. 2). The width across each second groove 10 is designed such that a clearance between the groove walls and each ball of the second ball set 6 is minimized. The second ball set 6 guides the movable frame 8 along the second grooves 10 in the pitch direction p. A spacing between the guide plate member 4 and the movable frame 8 accommodating the second ball set 6 is hereinafter referred to as a second clearance.

In the first embodiment, the most forward points, in the direction of the optical axis, of the three balls of the second ball set 6 lie in one plane perpendicular to the optical axis; thus, the surfaces 10a lie in the same plane. If the most forward points, in the direction of the optical axis, of the three balls of the second ball set 6 do not lie in one plane perpendicular to the optical axis, and are different in position in the direction of the optical axis, the surfaces 10a lie in a plurality of different planes perpendicular to the optical axis in accordance with the most forward points, in the direction of the optical axis, of the three balls of the second ball set 6.

A pitch magnet 11p and a pitch yoke 12p are mounted in a top center slot 1p of the support frame 1. A pitch coil 13p is mounted in the top center of the movable frame 8. A yaw magnet 11y and a yaw yoke 12y are mounted in a side center slot 1y. A yaw coil 13y is mounted in the side center of the movable frame 8. A front yoke 14 arranged is common to both yaw and pitch driving.

The coils 13p and 13y have a slight air gap to the magnets 11p and 11y and the yoke 14, and are placed in the magnetic circuit formed by the magnets and yoke. When a current flows through the coil 13p, the movable frame 8 is driven in the pitch direction, and when a current flows through the coil 13y, the movable frame 8 is driven in the yaw direction.

The movable frame 8 is provided with a pitch slit 15p and a yaw slit 15y, and unshown light emitting devices (infrared emitting diodes IREDs) and unshown light receiving devices (semiconductor position sensor devices PSDs) are provided corresponding to the pitch slit 15p and yaw slit 15y. With this arrangement, the position of the movable frame 8 in the pitch direction and yaw direction is detected. The movable frame 8 has, on its front end face 8d, three ball seats 8c slightly projected from the front end face 8d. The ball seats 8c have a smooth surface perpendicular to the optical axis (in parallel with the reference surfaces 3a) and remaining in contact with a pressure ball set 16 (steel balls), and therefore have an engagement area with a margin with the pressure ball set 16 (one of the three balls of the pressure ball set 16 is hidden behind an elastic member 18 in FIG. 1).

A ball retainer 17 has in its center an opening 17a for allowing the image light flux to pass therethrough, and holes 17b regularly spaced an angle of about 120° apart around the opening 17a for supporting the three balls of the pressure ball set 16 in a manner that allows the three balls to roll in a plane, perpendicular to the optical axis, in which the centers of the three balls lie (one of the three balls of the pressure ball set 16 is hidden behind the elastic member 18 in FIG. 1). The ball retainer 17 also has mounting arm portions 17c. The most forward points of the three balls of the pressure ball set 16 in the direction of the optical axis lie in one plane perpendicular to the optical axis and the most rear points of the three balls of the pressure ball set 16 in the direction of the optical axis lie in another plane perpendicular to the optical axis. The three balls are thus projected forward and rearward out of the ball retainer 17. In the first embodiment, the diameters of the three balls are set to be equal to each other.

The elastic member 18, namely a flat spring, has in its center an opening 18a for allowing the image light flux to therethrough, and mounting arm portions 18b regularly spaced an angle of about 120° apart around the opening 18a. On its rear face 18c, the elastic member 18 presses the three balls of the pressure ball set 16 to the extent that no excess load occurs with the movable frame 8 driven, while the elastic member 18 supports the weight of a movable frame unit 8u, including the correction lens 9 and the coils 13p and 13y, mounted on the movable frame 8, and the guide plate member 4 and the ball sets, and presses them in the direction of the optical axis in a minimum required force. Pressure adjusting washers 19 vary the spacing between the ball retainer 17 and the elastic member 18 to adjust the pressure the elastic member 18 exerts. The pressure adjusting washers 19 thus adjust the displacement of the pressure ball set 16 caused by the elastic member 18.

The three screws 20 passing through mounting holes 14a (one the three holes hidden behind the ball retainer 17 in FIG. 1), 17d, 18d and holes of washers 19 are screwed into the internal threads of the three bosses 1d of the support frame 1 to secure the front yoke 14, ball retainer 17, elastic member 18 and pressure adjusting washers 19 to the support frame 1. Designated 21 is the optical axis.

As described above, the movable frame unit 8u is movable in both the pitch direction and the yaw direction independently, and is free to move to a position determined by the composition of the pitch and yaw movements within a predetermined shift range.

Given a drive desired-value signal in the yaw component in the above system, a current is fed to the yaw coil 13y, generating an electromagnetic force in the yaw direction. The side walls of the second grooves 10 push the balls of the second ball set 6. The guide plate member 4 is guided by the first grooves 5 receiving the first ball set 2 and is driven in the yaw direction, and the movable frame unit 8u is consequently shifted by a predetermined distance in the yaw direction. Given a drive desired-value signal in the pitch component in the above system, a current is fed to the pitch coil 13p, generating an electromagnetic force in the pitch direction. The movable frame unit 8u, guided by its own grooves 10 receiving the second ball set 6, moves in the pitch direction relative to the guide plate member 4. Since the guide plate member 4 itself is fixed in the pitch direction, the movable frame unit 8u is shifted by a predetermined distance in the pitch direction when the side walls of the first grooves 5 of the guide plate member 4 push the first ball set 2.

When the drive desired-value signal corresponding to the composition of the pitch component and yaw component is input, the pitch coil 13p and yaw coil 13y are respectively driven such that an electromagnetic force shifts the movable frame unit 8u in a predetermined direction. The light emitting devices (infrared emitting diodes IREDs) and light receiving devices (semiconductor position sensor devices PSDs) provided corresponding to the pitch slit 15p and yaw slit 15y detect the position of the movable frame unit 8u in the pitch direction and yaw direction. The detected position signals are fed back to the drive desired-value signal indicating whether the movable frame unit 8u shifts to a desired position. Through such a feedback control, the movable frame unit 8u is shifted to the desired position.

The movable frame unit 8u is supported in parallel with the reference surfaces 3a of the support frame 1 perpendicular to the optical axis, without looseness in the direction of the optical axis, under an appropriate pressure which the elastic member 18 exerts through the steel ball sets 2, 6 and the guide plate member 4. The movable frame unit 8u is thus shifted in a plane perpendicular to the optical axis. Since the movable frame unit 8u is free from tilting with respect to the optical axis and looseness in the direction of the optical axis, the system suffers no optical performance degradation. Resistance associated with the steel balls is substantially smaller than the frictional resistance taking place in the sliding motion between a shaft and a bearing; thus, even a small electromagnetic driving works in the shifting operation of the correction lens. Since the rotation of the movable frame 8 about the optical axis is retrained by the guide plate member 4 rather than by the restoring force of spring member, the load from the spring member is not transmitted to the movable frame unit 8u during the shifting operation. This arrangement advantageously serves the purpose of reducing the required electromagnetic driving force.

In the first embodiment, the first ball set 3 is arranged on the support frame 1, the first grooves 5 are arranged on the guide plate member 4, the second ball holders 7 are arranged on the guide plate member 4, and the second grooves 10 are arranged on the movable frame 8. Conversely, the first ball set 3 may be arranged on the guide plate member 4, the first grooves 5 may be arranged on the support frame 1, the second ball holders 7 may be arranged on the movable frame 8 and the second grooves 10 may be arranged on the guide plate member 4.

Although resistance slightly increases, semi-spherical projections, functionally equivalent to the pressure ball set 16, may be integrally formed with the elastic member 18. With the pressure ball set 16 and the ball retainer 17 dispensed with, cost reduction is promoted.

Second Embodiment

Figure 4:
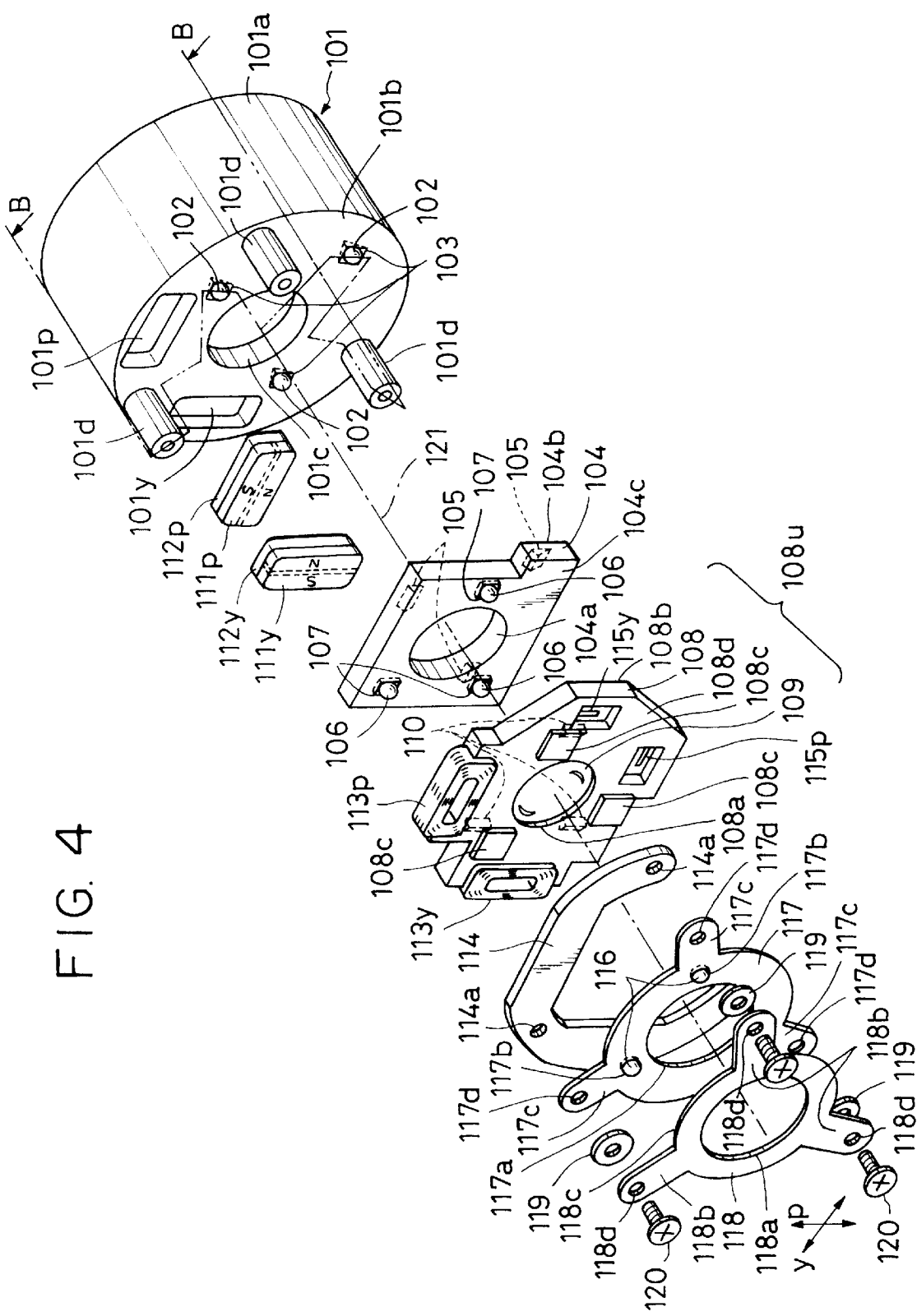
FIG. 4 is an exploded perspective view of a lens shift mechanism of a second embodiment of the present invention.
Figure 5:
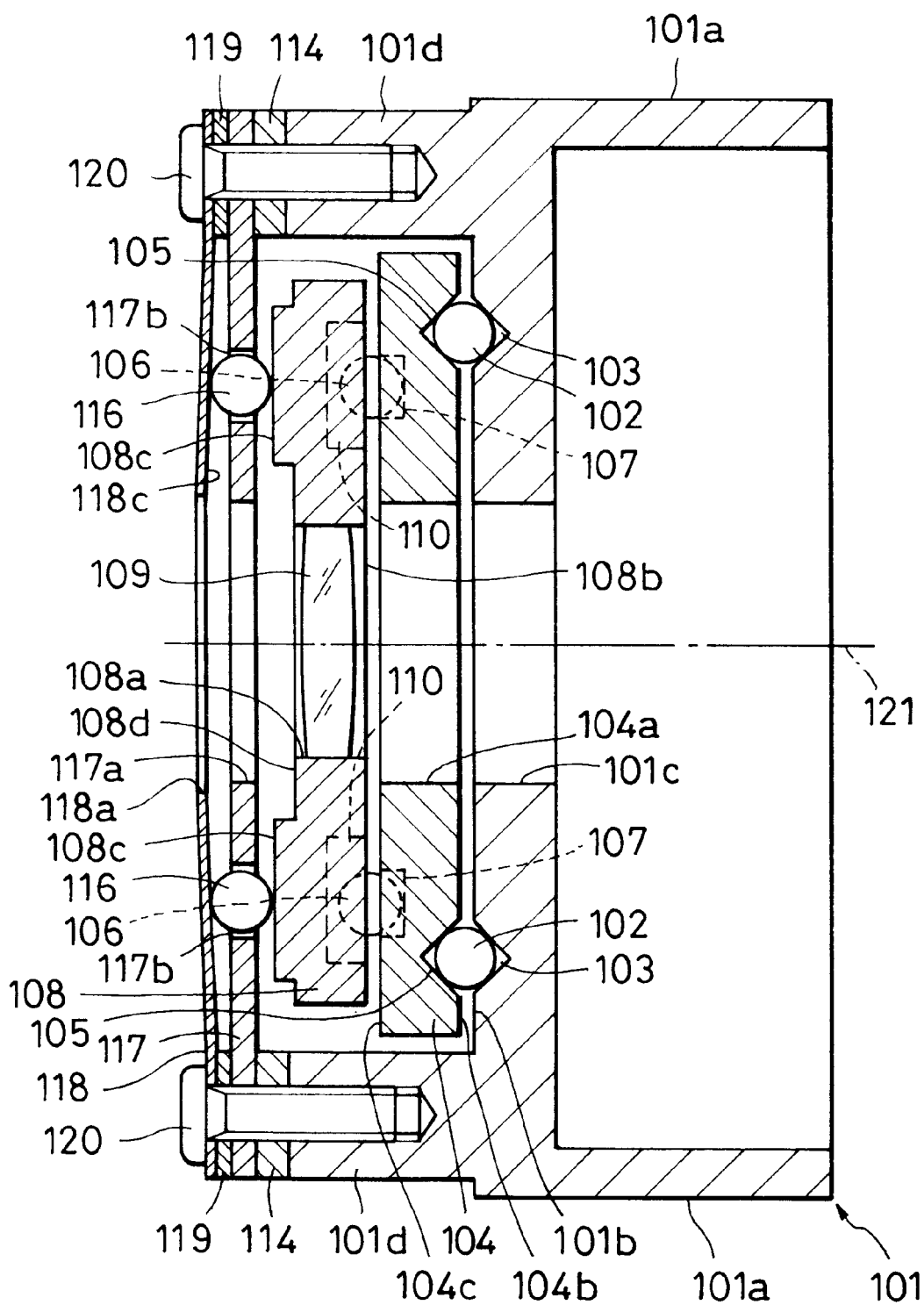
FIG. 5 is a cross-sectional view of the lens shift mechanism taken along a line B—B in FIG. 4.

FIG. 4 is an exploded perspective view of a lens shift mechanism of a second embodiment of the present invention, and FIG. 5 is a cross-sectional view of the lens shift mechanism taken along a line B—B in FIG. 4. The general construction of the vibration-proof system remains unchanged from that shown in FIG. 3.

In FIGS. 4 and 5, components equivalent to those described with reference to FIGS. 1 and 2 in connection with the first embodiment are designated with reference numerals with 100 added to the corresponding reference numerals in FIGS. 1 and 2.

Referring to FIGS. 4 and 5, the correction lens shift mechanism is now discussed.

A support frame 101 on its outer circumference 101a is engaged with an unshown lens barrel and is supported such that the support frame 101 moves in the direction of the optical axis only. The front end face 101b of the support frame 101 has in its center an opening 101c that allows an image light flux to pass therethrough. Designated 102 are three first support steel balls (hereinafter referred to as a first ball set). First ball holders 103 are regularly spaced an angle of about 120° apart around the opening 101c and support the respective three balls of the first ball set 102 in a manner that allows each ball to roll therewithin. The first ball holders 103 hold the respective balls such that the most forward points, in the direction of the optical axis, of the three balls lie in a plane perpendicular to the optical axis and are projected from the front end face 101b. The first ball holders 103 having a V-shape in cross section remain in contact with the respective balls in two points in cross section, thereby restraining the respective balls in position in both the direction of the optical axis and the direction perpendicular to the optical axis (see FIG. 5). The three first ball holders 103 are identical in shape to each other and are integrally formed with the support frame 101. In the second embodiment, the diameters of the three first balls 102 are set to be equal to each other.

A guide plate member 104 has in its center an opening 104a that allows the image light flux to pass therethrough, and has, on its rear end face 104b, first grooves 105 running by a length enough to cover a predetermined shift with a sufficient margin in the yaw direction y, in positions facing the respective balls of the first ball set 102. The first grooves 105 having a V-shape in cross section remain in contact with the respective balls 102 in two point in cross section, thereby restraining the respective balls in position in both the direction of the optical axis and the direction perpendicular to the optical axis (see FIG. 5). The three first grooves 105 are identical in shape to each other and are integrally formed with the guide plate member 104. The first ball set 102 guides the guide plate member 104 along the first grooves 105 in the yaw direction y in a plane perpendicular to the optical axis. A spacing between the support frame 101 and the guide plate member 104 accommodating the first ball set 102 is hereinafter referred to as a first clearance.

Designated 106 are three second support steel balls (hereinafter referred to as a second ball set). Second ball holders 107 are regularly spaced an angle of about 120° apart around the opening 104a and support the respective three balls of the second ball set 106 in a manner that allows each ball to roll therewithin. The second ball holders 107 hold the respective balls such that the most forward points, in the direction of the optical axis, of the three balls lie in a plane perpendicular to the optical axis and are projected from the front end face 104c of the guide plate member 104 in the same way as the first ball holders 103. The second ball holders 107 having a V-shape in cross section remain in contact with the respective balls in two points in cross section, thereby restraining the respective balls in position in both the direction of the optical axis and the direction perpendicular to the optical axis. The three second ball holders 107 are identical in shape to each other and are integrally formed with the guide plate member 104. The three balls of the second ball set 106 have the same diameter in the second embodiment.

A movable frame 108 has in its center an opening 108a for holding a correction lens 109, and on its rear end face 108b, second grooves 110 running by a length enough to cover a predetermined shift with a sufficient margin in the pitch direction p, in positions facing the respective balls of the second ball set 106, in the same way as the first grooves 105. The second grooves 110 having a V-shape in cross section remain in contact with the respective balls 106 in two point in cross section, thereby restraining the respective balls in position in both the direction of the optical axis and the direction perpendicular to the optical axis. The three second grooves 110 are identical in shape to each other and are integrally formed with the movable frame 108. The second ball set 106 guides the movable frame 108 along the second grooves 110 in the pitch direction p in a plane perpendicular to the optical axis. A spacing between the guide plate member 104 and the movable frame 108 accommodating the second ball set 106 is hereinafter referred to as a second clearance.

A pitch magnet 111p and a pitch yoke 112p are mounted in a top center slot 101p of the support frame 101. A pitch coil 113p is mounted in the top center of the movable frame 108. A yaw magnet 111y and a yaw yoke 112y are mounted in a side center slot 101y. A yaw coil 113y is mounted in the side center of the movable frame 108. A front yoke 114 arranged is common to both yaw and pitch driving.

The coils 113p and 113y have a slight air gap to the magnets 111p and 111y and the yoke 114, and are placed in the magnetic circuit formed by the magnets and yoke. When a current flows through the coil 113p, the movable frame 108 is driven in the pitch direction, and when a current flows through the coil 113y, the movable frame 108 is driven in the yaw direction.

The movable frame 108 is provided with a pitch slit 115p and a yaw slit 115y, and unshown light emitting devices (infrared emitting diodes IREDs) and unshown light receiving devices (semiconductor position sensor devices PSDs) are provided corresponding to the pitch slit 115p and yaw slit 115y. With this arrangement, the position of the movable frame 108 in the pitch direction and yaw direction is detected. The movable frame 108 has, on its front end face 108d, three ball seats 108c slightly projected from the front end face 108d. The ball seats 108c have a smooth surface perpendicular to the optical axis and remaining in contact with a pressure ball set 116 (steel balls), and therefore have an engagement area with a margin with the pressure ball set 116 (one of the three balls of the pressure ball set 116 is hidden behind an elastic member 118 in FIG. 4).

A ball retainer 117 has in its center an opening 117a for allowing the image light flux to pass therethrough, and holes 117b regularly spaced an angle of about 120° apart around the opening 117a for supporting the three balls of the pressure ball set 116 in a manner that allows the three balls to roll in a plane, perpendicular to the optical axis, in which the centers of the three balls lie (one of the three balls of the pressure ball set 116 is hidden behind the elastic member 118 in FIG. 4). The ball retainer 117 also has mounting arm portions 117c. The most forward points of the three balls of the pressure ball set 116 in the direction of the optical axis lie in one plane perpendicular to the optical axis and the most rear points of the three balls of the pressure ball set 116 in the direction of the optical axis lie in another plane perpendicular to the optical axis. The three balls are thus projected forward and rearward out of the ball retainer 117. In the second embodiment, the diameters of the three balls 116 are set to be equal to each other.

The elastic member 118, namely a flat spring, has in its center an opening 118a for allowing the image light flux to pass therethrough, and mounting arm portions 118b regularly spaced an angle of about 120° apart around the opening 118a. On its rear face 118c, the elastic member 118 presses the three balls of the pressure ball set 116 to the extent that no excess load occurs with the movable frame 108 driven, while the elastic member 118 supports the weight of a movable frame unit 108u, including the correction lens 109 and the coils 113p and 113y, mounted on the movable frame 108, and the guide plate member 104 and the ball sets, and presses them in the direction of the optical axis in a minimum required force. Pressure adjusting washers 119 vary the spacing between the ball retainer 117 and the elastic member 118 to adjust the pressure the elastic member 118 exerts. The pressure adjusting washers 119 thus adjust the displacement of the pressure ball set 116 caused by the elastic member 118.

The three screws 120 passing through mounting holes 114a (one the three holes hidden behind the ball retainer 117 in FIG. 4), 117d, 118d and holes of washers 119 are screwed into the internal threads of the three bosses 101d of the support frame 101 to secure the front yoke 114, ball retainer 117, elastic member 118 and pressure adjusting washers 119 to the support frame 101. Designated 121 is the optical axis.

As described above, the movable frame unit 108u is movable in both the pitch direction and the yaw direction independently, and is free to move to a position determined by the composition of the pitch and yaw movements within a predetermined shift range.

Given a drive desired-value signal in the yaw component in the above system, a current is fed to the yaw coil 113y, generating an electromagnetic force in the yaw direction. The V-shaped, second grooves 110 push the balls 106 of the second ball set 106. The guide plate member 104 is guided by the first grooves 105 receiving the first ball set 102 and is driven in the yaw direction, and the movable frame unit 108u is consequently shifted by a predetermined distance in the yaw direction. Given a drive desired-value signal in the pitch component in the above system, a current is fed to the pitch coil 113p, generating an electromagnetic force in the pitch direction. The movable frame unit 108u, guided by its own second grooves 110 receiving the second ball set 106, moves in the pitch direction relative to the guide plate member 104. Since the guide plate member 104 itself is fixed in the pitch direction, the movable frame unit 8u is shifted by a predetermined distance in the pitch direction when the walls of first V-shaped grooves 105 of the guide plate member 104 push the first ball set 102.

When the drive desired-value signal corresponding to the composition of the pitch component and yaw component is input, the pitch coil 113p and yaw coil 113y are respectively driven such that an electromagnetic force shifts the movable frame unit 108u in a predetermined direction. The light emitting devices (infrared emitting diodes IREDs) and light receiving devices (semiconductor position sensor devices PSDs) provided corresponding to the pitch slit 115p and yaw slit 115y detect the position of the movable frame unit 108u in the pitch direction and yaw direction. The detected position signals are fed back to the drive desired-value signal indicating whether the movable frame unit 108u shifts to a desired position. Through such a feedback control, the movable frame unit 108u is shifted to the desired position.

The movable frame unit 108u is supported in parallel with the reference surfaces 103a of the support frame 101 perpendicular to the optical axis, without looseness in the direction of the optical axis, under an appropriate pressure which the elastic member 118 exerts through the steel ball sets 102, 106 and the guide plate member 104. The movable frame unit 108u thus shifts in a plane perpendicular to the optical axis. Since the movable frame unit 108u is free from tilting with respect to the optical axis and looseness in the direction of the optical axis, the system suffers no optical performance degradation. Resistance associated with the steel balls is substantially smaller than the frictional resistance taking place in the sliding motion between a shaft and a bearing; thus, even a small electromagnetic driving force works in the shifting operation of the correction lens. Since the rotation of the movable frame 108 about the optical axis is retrained by the guide plate member 104 rather than by the restoring force of spring member, the load from the spring member is not transmitted to the movable frame unit 108u during the shifting operation. This arrangement advantageously serves the purpose of reducing the required electromagnetic driving force.

All ball holders and grooves are V-shaped in cross section to allow the balls to seat therewithin without looseness. The second embodiment is thus free from the looseness taking place in the pitch and yaw directions between the balls and the holders and grooves in the first embodiment and permits high-precision correction lens shift control capable of fine shifting.

In the second embodiment, the first ball set 103 is arranged on the support frame 101, the first grooves 105 are arranged on the guide plate member 104, the second ball holders 107 are arranged on the guide plate member 104, and the second grooves 110 are arranged on the movable frame 108. Conversely, the first ball set 103 may be arranged on the guide plate member 104, the first grooves 105 may be arranged on the support frame 101, the second ball holders 107 may be arranged on the movable frame 108 and the second grooves 110 may be arranged on the guide plate member 104.

Although resistance slightly increases, semi-spherical projections, functionally equivalent to the pressure ball set 116, may be integrally formed with the elastic member 118. With the pressure ball set 116 and the ball retainer 117 dispensed with, cost reduction is promoted.

Third Embodiment

Figure 6:
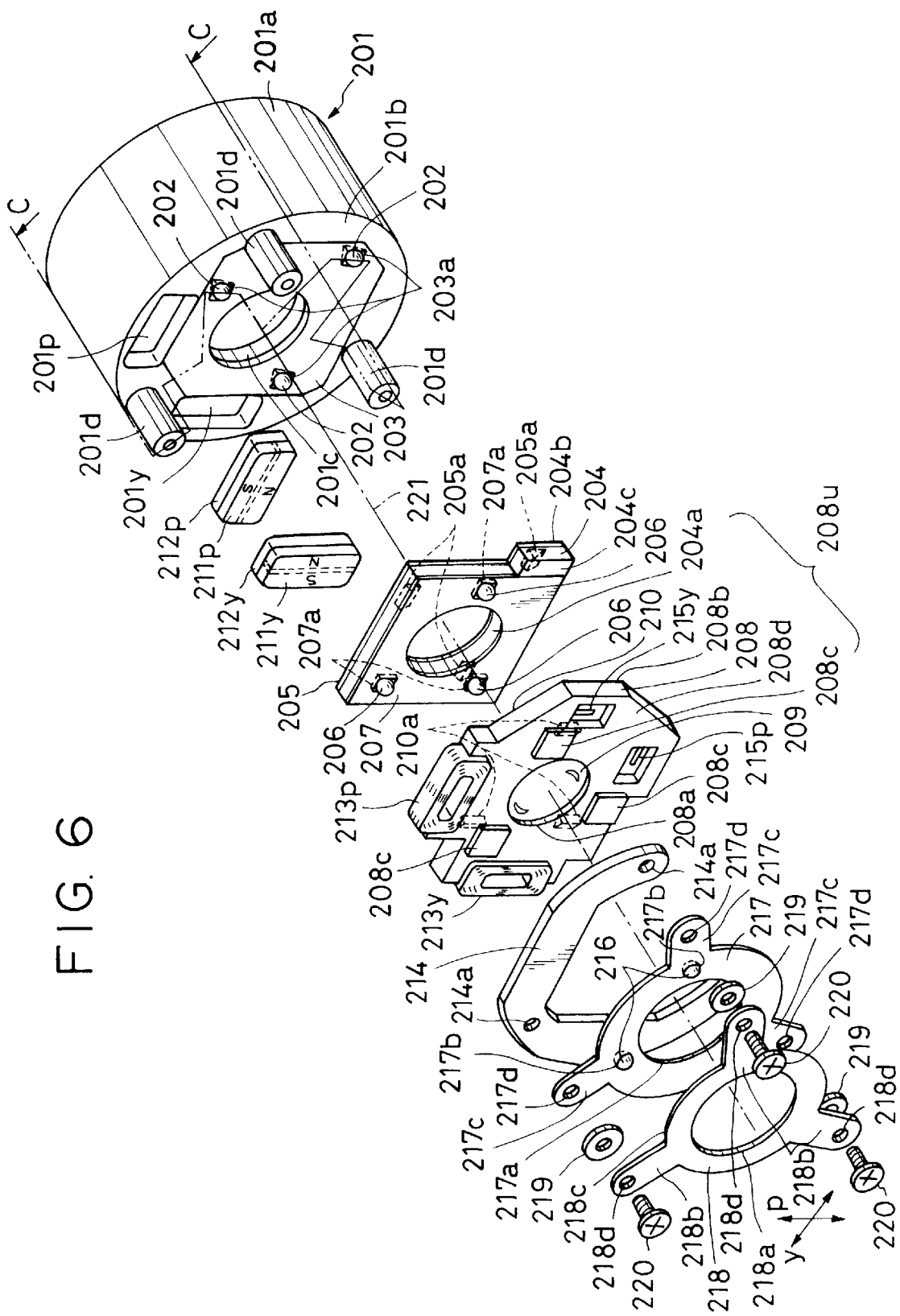
FIG. 6 is an exploded perspective view of a lens shift mechanism of a third embodiment of the present invention.
Figure 7:
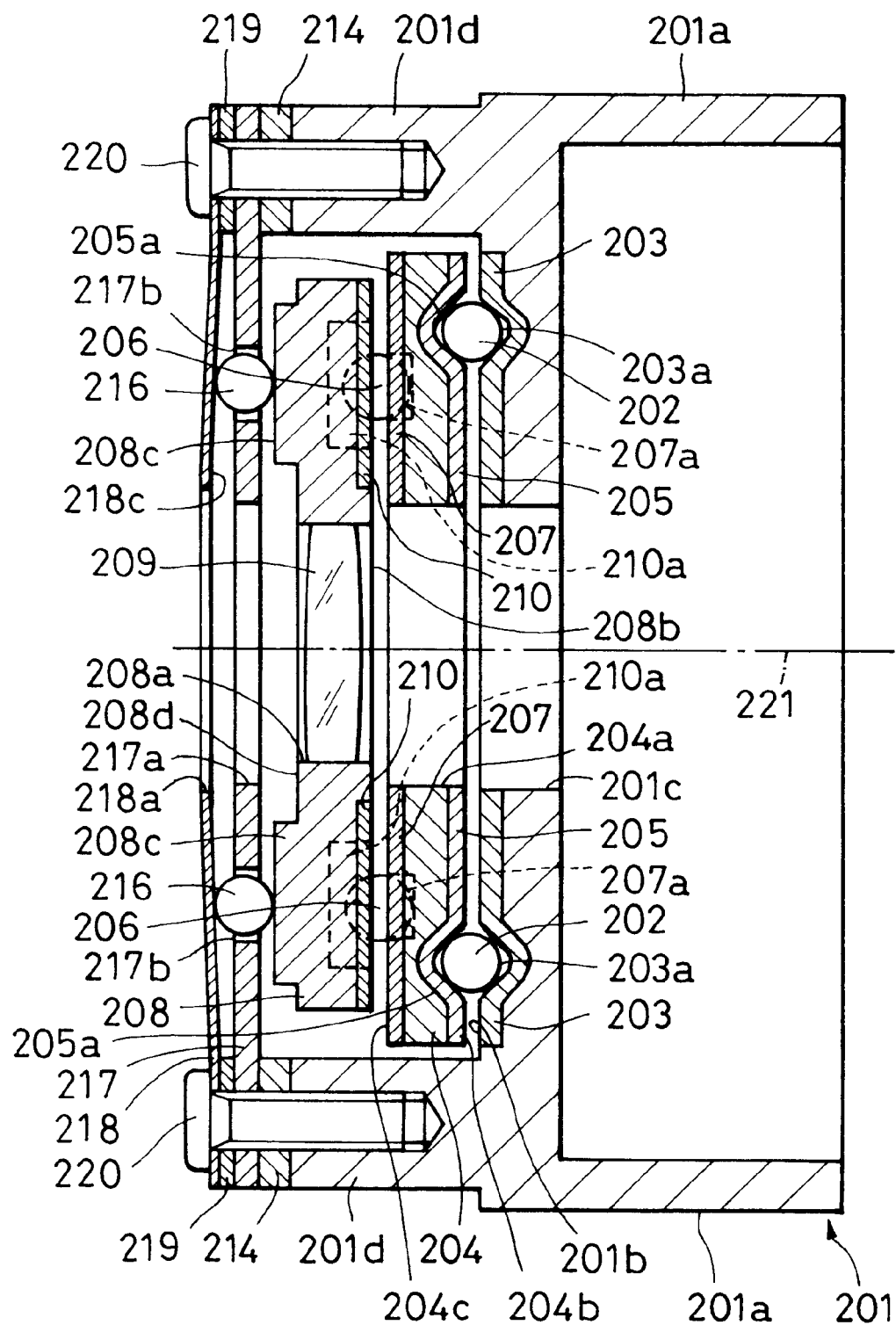
FIG. 7 is a cross-sectional view of the lens shift mechanism taken along a line C—C in FIG. 6.

FIG. 6 is an exploded perspective view of a lens shift mechanism of a third embodiment of the present invention, and FIG. 7 is a cross-sectional view of the lens shift mechanism taken along a line C—C in FIG. 6. The general construction of the vibration-proof system remains unchanged from that shown in FIG. 3.

In FIGS. 6 and 7, components equivalent to those described with reference to FIGS. 1 and 2 in connection with the first embodiment are designated with reference numerals with 200 added to the corresponding reference numerals in FIGS. 1 and 2.

Referring to FIGS. 6 and 7, the correction lens shift mechanism is now discussed.

A support frame 201 on its outer circumference 201a is engaged with an unshown lens barrel and is supported such that the support frame 201 moves in the direction of the optical axis only. The front end face 201a of the support frame 201 has in its center an opening 201c that allows an image light flux to pass therethrough. Designated 202 are three first support steel balls (hereinafter referred to as a first ball set). First ball holder members 203 are arranged on the front end face 201b. First holder portions 203a respectively integrally formed with the first ball holders 203 are constructed of a material harder than that of the support frame 201, are regularly spaced an angle of about 120° apart around the opening 201c and support the respective three balls of the first ball set 202 in a manner that allows each ball to roll therewithin. The first holder portions 203a hold the respective balls such that the most forward points, in the direction of the optical axis, of the three balls lie in a plane perpendicular to the optical axis and are projected from the front end face 201b. The first ball holder portions 203a having a V-shape in cross section remain in contact with the respective balls in two points in cross section, thereby restraining the respective balls in position in both the direction of the optical axis and the direction perpendicular to the optical axis (see FIG. 7). The three first ball holder portions 203a are identical in shape to each other as shown in FIGS. 6 and 7. In the third embodiment, the diameters of the three first balls 202 are set to be equal to each other.

A guide plate member 204 has in its center an opening 204a that allows the image light flux to pass therethrough, and has, on its rear end face 204b, first groove members 205 (see FIG. 7). The first groove members 205 have, at positions facing the first ball set 202, first groove portions 205a that remain in contact with the respective balls 202 at two points in cross section. The first groove portions 205a have in cross section a V-shape which restrain the respective balls in position in both the direction of the optical axis and the direction perpendicular to the optical axis, and are constructed of a material harder than that of the guide plate member 204. The three first groove portions 205a are identical in shape and run by a length enough to cover a predetermined shift with a sufficient margin in the yaw direction y and are respectively integrally formed with the groove members 205. The first ball set 202 thus guides the guide plate member 204 along the first groove portions 205a in the yaw direction y in a plane perpendicular to the optical axis. A spacing between the support frame 201 and the guide plate member 204 accommodating the first ball set 202 is hereinafter referred to as a first clearance.

Designated 206 are three second support steel balls (hereinafter referred to as a second ball set). Second ball holder members 207 are arranged on the front end face 204c of the guide plate member 204. Second ball holder portions 207a integrally formed with the second ball holder members 207 are constructed of a material harder than that of the guide plate member 204 and are regularly spaced an angle of about 120° apart around the opening 204a and support the three balls of the second ball set 206 in a manner that allows each ball to roll therewithin. Like the first ball holder portions 203a, the second ball holder portions 207a hold the respective balls such that the most forward points, in the direction of the optical axis, of the three balls lie in a plane perpendicular to the optical axis and are projected from the front end face 204c of the guide plate member 204. The second ball holder portions 207a having a V-shape in cross section remain in contact with the respective balls in two points in cross section, thereby restraining the respective balls in position in both the direction of the optical axis and the direction perpendicular to the optical axis. The three second ball holders 207a are identical in shape to each other (see FIG. 7). The three balls of the second ball set 206 have the same diameter in the third embodiment.

A movable frame 208 has in its center an opening 208a for holding a correction lens 209, and on its rear end face 208b, second groove members 210. The second groove members 210 have, at positions facing the second ball set 206, second groove portions 210a that remain in contact with the respective balls 206 at two points in cross section, like the first groove portions 205a. The second groove portions 210a have in cross section a V-shape which restrains the respective balls in position in both the direction of the optical axis and the direction perpendicular to the optical axis, and are constructed of a material harder than that of the movable frame 208. The three second groove portions 210a are identical in shape and run by a length enough to cover a predetermined shift with a sufficient margin in the pitch direction p and are integrally formed with the groove members 210. The second ball set 206 thus guides the movable frame 208 along the second groove portions 210a in the pitch direction p in a plane perpendicular to the optical axis. A spacing between the guide plate member 204 and the movable frame 208 accommodating the second ball set 206 is hereinafter referred to as a second clearance.

A pitch magnet 211p and a pitch yoke 212p are mounted in a top center slot 201p of the support frame 201. A pitch coil 213p is mounted in the top center of the movable frame 208. A yaw magnet 211y and a yaw yoke 212y are mounted in a side center slot 201y. A yaw coil 213y is mounted in the side center of the movable frame 208. A front yoke 214 arranged is common to both yaw and pitch driving.

The coils 213p and 213y have a slight air gap to the magnets 211p and 211y and the yoke 214, and are placed in the magnetic circuit formed by the magnets and yoke. When a current flows through the coil 213p, the movable frame 208 is driven in the pitch direction, and when a current flows through the coil 213y, the movable frame 208 is driven in the yaw direction.

The movable frame 208 is provided with a pitch slit 215p and a yaw slit 215y, and unshown light emitting devices (infrared emitting diodes IREDs) and unshown light receiving devices (semiconductor position sensor devices PSDs) are provided corresponding to the pitch slit 215p and yaw slit 215y. With this arrangement, the position of the movable frame 208 in the pitch direction and yaw direction is detected. The movable frame 208 has, on its front end face 208d, three ball seats 208c slightly projected from the front end face 208d. The ball seats 208c have a smooth surface perpendicular to the optical axis and remaining in contact with a pressure ball set 216 (steel balls), and therefore have an engagement area with a margin with the pressure ball set 216 (one of the three balls of the pressure ball set 216 is hidden behind an elastic member 218 in FIG. 6).

A ball retainer 217 has in its center an opening 217a for allowing the image light flux to pass therethrough, and holes 217b regularly spaced an angle of about 120° apart around the opening 217a for supporting the three balls of the pressure ball set 216 in a manner that allows the three balls to roll in a plane, perpendicular to the optical axis, in which the centers of the three balls lie (one of the three balls of the pressure ball set 216 is hidden behind the elastic member 218 in FIG. 6). The ball retainer 217 also has mounting arm portions 217c. The most forward points of the three balls of the pressure ball set 216 in the direction of the optical axis lie in one plane perpendicular to the optical axis and the most rear points of the three balls of the pressure ball set 216 in the direction of the optical axis lie in another plane perpendicular to the optical axis. The three balls are thus projected forward and rearward out of the ball retainer 217. In the third embodiment, the diameters of the three balls 216 are set to be equal to each other.

The elastic member 218, namely a flat spring, has in its center an opening 118a for allowing the image light flux to pass therethrough, and mounting arm portions 218b regularly spaced an angle of about 120° apart around the opening 218a. On its rear face 218c, the elastic member 218 presses the three balls of the pressure ball set 216 to the extent that no excess load occurs with the movable frame 208 driven, while the elastic member 218 supports the weight of a movable frame unit 208u, including the correction lens 209 and the coils 213p and 213y, mounted on the movable frame 208, and the guide plate member 204 and the ball sets, and presses them in the direction of the optical axis in a minimum required force. Pressure adjusting washers 219 vary the spacing between the ball retainer 217 and the elastic member 218 to adjust the pressure the elastic member 218 exerts. The pressure adjusting washers 219 thus adjust the displacement of the pressure ball set 216 caused by the elastic member 218.

The three screws 220 passing through mounting holes 214a (one the three holes hidden behind the ball retainer 217 in FIG. 6), 217d, 218d and holes of washers 219 are screwed into the internal threads of the three bosses 201d of the support frame 201 to secure the front yoke 214, ball retainer 217, elastic member 218 and pressure adjusting washers 219 to the support frame 201. Designated 221 is the optical axis.

As described above, the movable frame unit 208u is movable in both the pitch direction and the yaw direction independently, and is free to move to a position determined by the composition of the pitch and yaw movements within a predetermined shift range.

Given a drive desired-value signal in the yaw component in the above system, a current is fed to the yaw coil 213y, generating an electromagnetic force in the yaw direction. The V-shaped, second groove portions 210a push the balls of the second ball set 206. The guide plate member 204 is guided by the first grooves 205 receiving the first ball set 202 and is driven in the yaw direction, and the movable frame unit 208u is consequently shifted by a predetermined distance in the yaw direction. Given a drive desired-value signal in the pitch component in the above system, a current is fed to the pitch coil 213p, generating an electromagnetic force in the pitch direction. The movable frame unit 208u, guided by its own second groove portions 210a receiving the second ball set 206, moves in the pitch direction relative to the guide plate member 204. Since the guide plate member 204 itself is fixed in the pitch direction, the movable frame unit 8u is shifted by a predetermined distance in the pitch direction when the walls of first V-shaped grooves 205a of the guide plate member 204 push the first ball set 202.

When the drive desired-value signal corresponding to the composition of the pitch component and yaw component is input, the pitch coil 213p and yaw coil 213y are respectively driven such that an electromagnetic force shifts the movable frame unit 208u in a predetermined direction. The light emitting devices (infrared emitting diodes IREDs) and light receiving devices (semiconductor position sensor devices PSDs) provided corresponding to the pitch slit 215p and yaw slit 215y detect the position of the movable frame unit 208u in the pitch direction and yaw direction. The detected position signals are fed back to the drive desired-value signal indicating whether the movable frame unit 208u shifts to a desired position. Through such a feedback control, the movable frame unit 208u is shifted to the desired position.

The movable frame unit 208u is supported in parallel with the reference surfaces 203a of the support frame 201 perpendicular to the optical axis, without looseness in the direction of the optical axis, under an appropriate pressure which the elastic member 218 exerts through the steel ball sets 202, 206 and the guide plate member 204. The movable frame unit 208u thus shifts in a plane perpendicular to the optical axis. Since the movable frame unit 208u is free from tilting with respect to the optical axis and looseness in the direction of the optical axis, the system suffers no optical performance degradation. Resistance associated with the steel balls is substantially smaller than the frictional resistance taking place in the sliding motion between a shaft and a bearing; thus, even a small electromagnetic driving force works in the shifting operation of the correction lens. Since the rotation of the movable frame 208 about the optical axis is retrained by the guide plate member 204 rather than by the restoring force of spring member, the load from the spring member is not transmitted to the movable frame unit 208u during the shifting operation. This arrangement advantageously serves the purpose of reducing the required electromagnetic driving force.

All ball holders and grooves are V-shaped in cross section to allow the balls to seat therewithin without looseness. The third embodiment is thus free from the looseness taking place in the pitch and yaw directions between the balls and the holders and grooves in the first embodiment and permits high-precision correction lens shift control capable of fine shifting.

When precision required of the correction lens shift control is not so high, the construction shown in the first embodiment is perfectly acceptable in which ball holders and grooves having in cross section a rectangular socket portion which allows the balls to roll therewithin and with a small gap between the ball and its respective holder and groove permitted. The first and second ball holders 3 and 7 and first and second grooves 5 and 10 may be constructed of a material harder than that of the support frame 1 and guide plate member 4 for higher mechanical strength.

According to the third embodiment, the ball holder portions and groove portions, in contact with the respective balls, have a higher hardness to protect themselves from deformation arising from external undue force applied and to improve wear resistance. The image stabilizer thus performs a reliable, high-precision shift control.

In the third embodiment, the first ball holder portions 203*a* are arranged on the support frame 201, the first groove portions 205*a* are arranged on the guide plate member 204, the second ball holder portions 207*a* are arranged on the guide plate member 204, and the second groove portions 210*a* are arranged on the movable frame 208. Conversely, the first ball holder portions 203*a* may be arranged on the guide plate member 204, the first groove portions 205*a* may be arranged on the support frame 201, the second ball holder portions 207*a* may be arranged on the movable frame 208 and the second groove portions 210*a* may be arranged on the guide plate member 204.

Although resistance slightly increases, semi-spherical projections, functionally equivalent to the pressure ball set 216, may be integrally formed with the elastic member 218. With the pressure ball set 216 and the ball retainer 217 dispensed with, cost reduction is promoted.

According to each of the above embodiments, the guide plate member is interposed between the movable frame and the support frame to support the movable frame holding the correction lens with the rolling balls. The balls are captured by the first grooves arranged on the movable frame for guiding the movable frame in one direction, and the balls are captured by the second grooves running in perpendicular to the first grooves. The correction lens is moved in the pitch and yaw directions in a plane perpendicular to the optical axis with the rotation of the movable frame about the optical axis restrained. The elastic member presses the movable frame against the balls in the direction of the optical axis.

With the above simple arrangement, the rotation of the movable frame about the optical axis is retrained by the guide plate member rather than by the restoring force of spring member. The load from the spring member is not transmitted to the movable frame unit during the shifting operation. This arrangement takes advantage of the rolling motion of the balls which involves a small frictional resistance, reducing the driving force required for driving the correction lens. Since the movable frame is free from tilting with respect to the optical axis and looseness in the direction of the optical axis, the system suffers no optical performance degradation, permitting high-precision correction lens shift control capable of fine shifting. When extremely high-precision correction lens shift control is not a requirement, a compact electromagnetic driving unit works, a compact shift mechanism works and energy involved in the operation is thus saved. The simple mechanism reduces the component count, the number of manufacturing steps and the manufacturing cost of the system.

The ball holder portions and groove portions remain in contact with the respective balls in two points in cross section, thereby restraining the balls both in the direction of the optical axis and the direction perpendicular to the optical axis. This arrangement makes the correction lens less subject to looseness in the shift plane, permitting high-precision correction lens shift control capable of fine shifting.

The ball holder portions and groove portions, in contact with the respective balls, have a higher hardness to protect themselves from deformation arising from external undue force applied and to improve wear resistance. The image stabilizer thus performs a reliable, high-precision shift control.

In the above embodiments, three ball holders are employed. Alternatively, more than three ball holders may be employed.

According to the first through third embodiments of the present invention, the lens shift mechanism is of a simple construction, and reliably shifts the correction lens in a plane perpendicular to the optical axis with small resistance encountered in the driving of the correction lens and without looseness in the direction of the optical axis.

According to the first through third embodiment of the present invention, the lens shift mechanism performs a reliable, high-precision shift control free from looseness in the shift plane of the lens.

According to the first through third embodiments of the present invention, the lens shift mechanism protects the first and second ball holder portions and first and second groove portions from deformation arising from external undue force applied and features a strong wear resistance, and performs a reliable, high-precision shift control.

Fourth Embodiment

A fourth embodiment of the present invention is now discussed.

Figure 8:
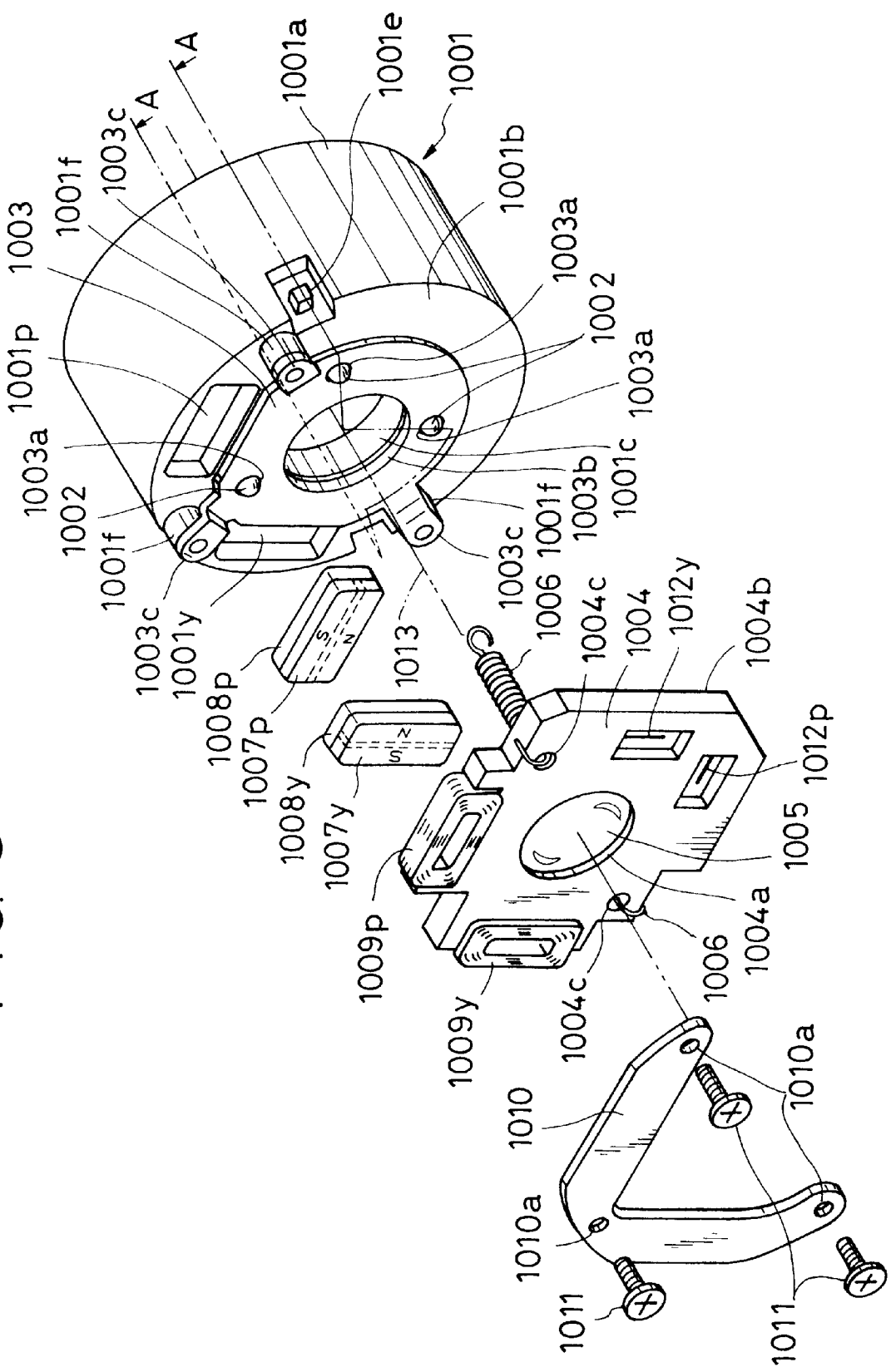
FIG. 8 is an exploded perspective view of a lens shift mechanism of a fourth embodiment of the present invention.
Figure 9:
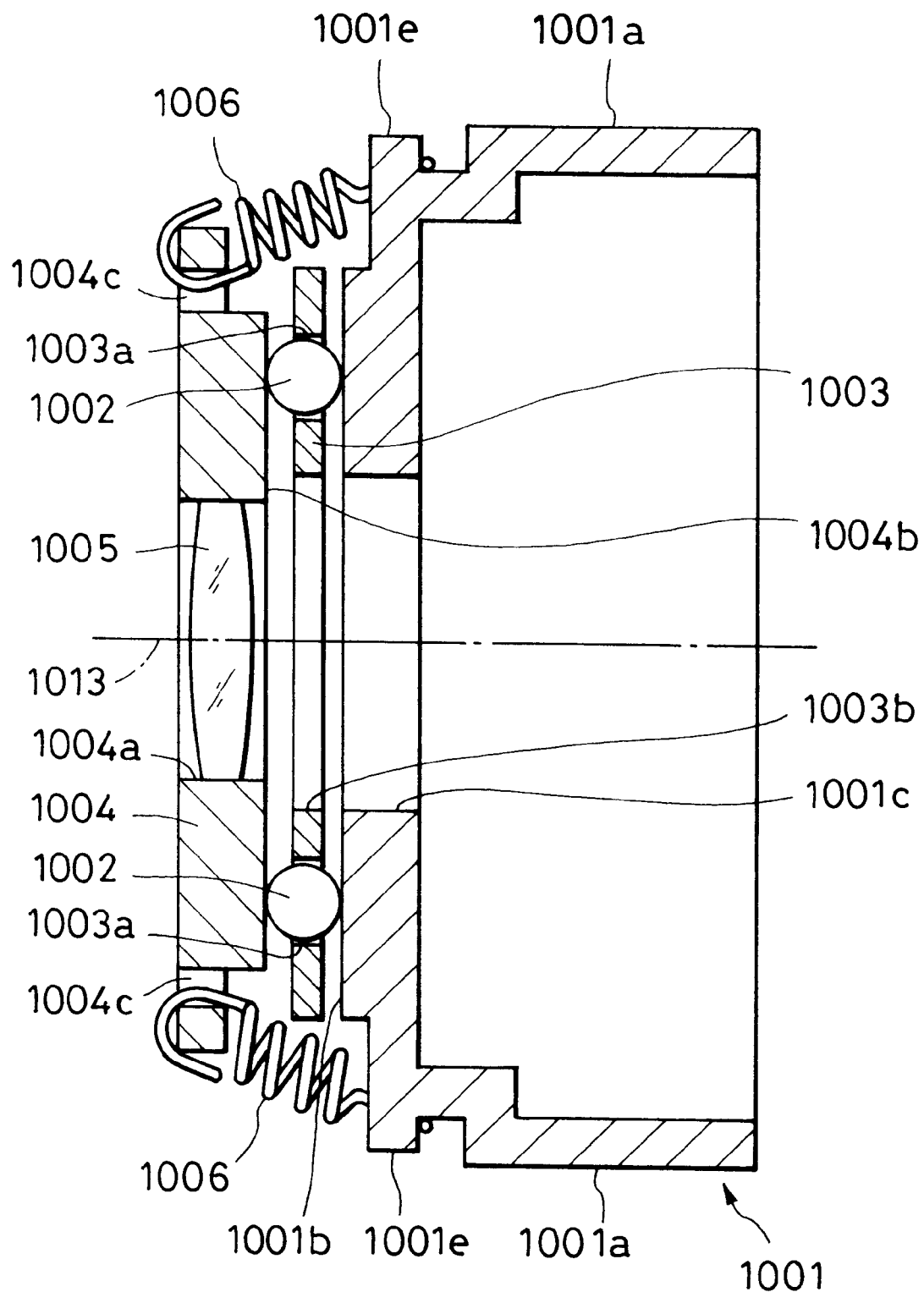
FIG. 9 is a cross-sectional view of the lens shift mechanism taken along a line A—A in FIG. 8.
Figure 10:
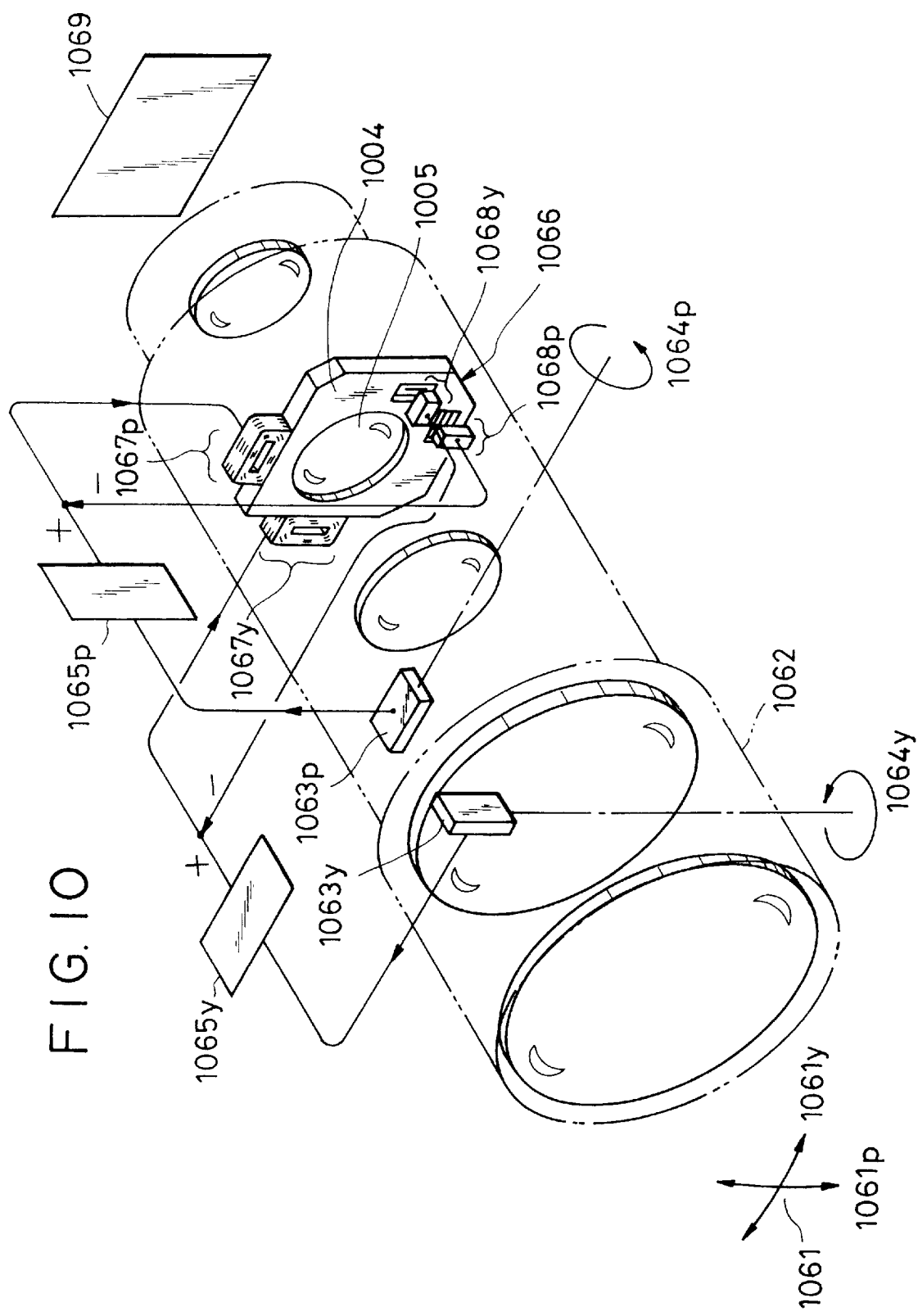
FIG. 10 is a perspective view showing generally a typical vibration-proof system.

FIG. 8 is an exploded perspective view of a lens shift mechanism of the fourth embodiment of the present invention, and FIG. 9 is a cross-sectional view of the lens shift mechanism taken along a line A—A in FIG. 8. FIG. 10 is a perspective view showing generally a typical vibration-proof system.

Referring to FIG. 10, an image stabilizer (vibration-proof system) incorporating an angular displacement detector as a vibration sensor is discussed.

FIG. 10 shows the system for controlling image blurring resulting from the vertical component 1061*p* and horizontal component 1061*y* of camera shake represented by arrows 1061.

Shown in FIG. 10 are a lens barrel 1062 having an imaging optical system, and angular displacement detectors 1063*p* and 1063*y* for detecting respectively the vertical angular displacement and horizontal angular displacement of the camera vibration, and 1064*p* and 1064*y* denote respectively the directions of angular displacement. Arithmetic circuits 1065*p* and 1065*y* compute drive desired-value signals for a correction lens shift mechanism 1066 based on the signals from the angular displacement detectors 1063*p* and 1063*y*. In response to the drive desired-value signals, the correction lens shift mechanism 1066 (including drive units 1067*p* and 1067*y* and shift position sensors 1068*p* and 1068*y*) operates to stabilize an image on an image plane 1069.

The correction lens shift mechanism 1066 shown in FIGS. 8 and 9 is now discussed.

A support frame 1001 on its outer circumference 1001*a* is engaged with an unshown lens barrel and is supported such that the support frame 1001 moves in the direction of the optical axis only. The front end face 1001b of the support frame 1001 has in its center an opening 1001c that allows an image light flux to pass therethrough.

A ball retainer 1003 has in its center an opening 1003b for allowing the image light flux to pass therethrough, and holes 1003a regularly spaced an angle of about 120° apart around the opening 1003b for supporting three balls 1002 in a manner that allows the three balls to roll in a plane, perpendicular to the optical axis, in which the centers of the three balls lie. The most forward points of the three balls 1002 in the direction of the optical axis lie in one plane perpendicular to the optical axis and the most rear points of the three balls 1002 in the direction of the optical axis lie in another plane perpendicular to the optical axis. The three balls are thus projected forward and rearward out of the ball retainer 1003 (see FIG. 9). In the fourth embodiment, the front end face 1001b serves as a reference surface perpendicular to the optical axis and remains in contact with the balls 1002.

Since the three balls have the same diameter in third embodiment, the reference surface 1001b (see FIG. 9) are in one plane. If the three balls have different diameters, the reference surface 1001b is constituted by a plurality of different planes.

A movable frame 1004 has in its center an opening 1004a for holding a correction lens 1005, and on its rear side a surface 1004b which is in parallel with and faces the reference surface 1001b and is in contact with the balls 1002. The surface 1004b has ball seats for engaging with the balls 1002. The ball seats are wide enough to keep the respective balls therewithin to cover the shift range of the correction lens with a sufficient margin.

Since the most forward points of the three balls in the direction of the optical axis lie in a plane perpendicular to the optical axis in the fourth embodiment, the surface 1004b lies in one plane. If the most forward points of the three balls do not lie in a plane perpendicular to the optical axis, the surface 1004b is constituted by a plurality of planes perpendicular to the optical axis. In this case as well, each surface 1004b has a ball seat wide enough to keep the ball therewithin to cover the shift range of the correction lens with a sufficient margin.

An elastic member 1006, namely a tension coil spring, is extended in a modest tension with its rear end anchored at a projected hook 1001e of the support frame 1001 and its front end anchored at a hook hole 1004c formed at the edge of the movable frame 1004. The elastic member 1006 thus pulls the movable frame 1004 outwardly and slantly backwardly with respect to the optical axis.

A pair of elastic members 1006 are arranged in diagonally opposite positions, and exert a minimum required force to cause the movable frame 1004 to make the optical axis of the correction lens 1005 coincide with the optical axis of the lens barrel while at the same time restoring the movable frame 1004 to its original position about the optical axis. The pair of elastic members 1006 further exert a minimum pressure to keep the balls in between the rear surface 1004b of the movable frame 1004 and the reference surface 1001b of the support frame 1001.

A pitch magnet 1007p and a pitch yoke 1008p are mounted in a top center slot 1001p of the support frame 1001. A pitch coil 1009p is mounted in the top center of the movable frame 1004. A yaw magnet 1007y and a yaw yoke 1008y are mounted in a side center slot 1001y.

A yaw coil 1009y is mounted in the side center of the movable frame 1004. A front yoke 1010 arranged is common to both yaw and pitch driving. Three screws 1011 passing through three holes 1010a and three mounting arms 1003c of the ball retainer 1003 are screwed into the internal threads of three bosses 1001f on the support frame 1001 to secure the front yoke 1010 and the ball retainer 1003 to the support frame 1001.

The coils 1009p and 1009y have a slight air gap to the magnets 1007p and 1007y and the yoke 1010, and are placed in the magnetic circuit formed by the magnets and yoke. When a current flows through the coil 1009p, the movable frame 1004 is driven in the pitch direction, and when a current flows through the coil 1009y, the movable frame 1004 is driven in the yaw direction.

The movable frame 1004 is provided with a pitch slit 1012p and a yaw slit 1012y, and unshown light emitting devices (infrared emitting diodes IREDs) and unshown light receiving devices (semiconductor position sensor devices PSDs) are provided corresponding to the pitch slit 1012p and yaw slit 1012y. With this arrangement, the position of the movable frame 1004 in the pitch direction and yaw direction is detected. Designated 1013 is the optical axis.

Since the movable frame 1004 is supported in parallel with the reference surface 1001b of the support frame 1001 perpendicular to the optical axis, without looseness in the direction of the optical axis, with the balls 1002 interposed therebetween, the movable frame 1004 is shifted in a plane perpendicular to the optical axis 1013.

Optical performance of the system resulting from looseness or tilt of the movable frame is thus precluded. Resistance associated with the steel balls is substantially smaller than the frictional resistance taking place in the sliding motion between a shaft and a bearing; thus, even a small electromagnetic driving force works in the shifting operation of the correction lens. The pair of elastic members 1006, namely tension coil springs, prevent the movable frame 1004 from rotating about the optical axis while pressing the movable frame 1004 against the balls to preclude looseness in the optical direction during the shifting operation.

With the above simple arrangement, the shift driving force required for shifting the correction lens supported by the movable frame is reduced. Optical performance of the system resulting from looseness or tilt of the movable frame is thus precluded and high-precision correction lens shift control capable of fine shifting is thus performed. When extremely high-precision correction lens shift control is not a requirement, a compact electromagnetic driving unit works, a compact shift mechanism works and energy involved in the operation is saved. The simple mechanism reduces the component count, the number of manufacturing steps and the manufacturing cost of the system.

Fifth Embodiment

Figure 11:
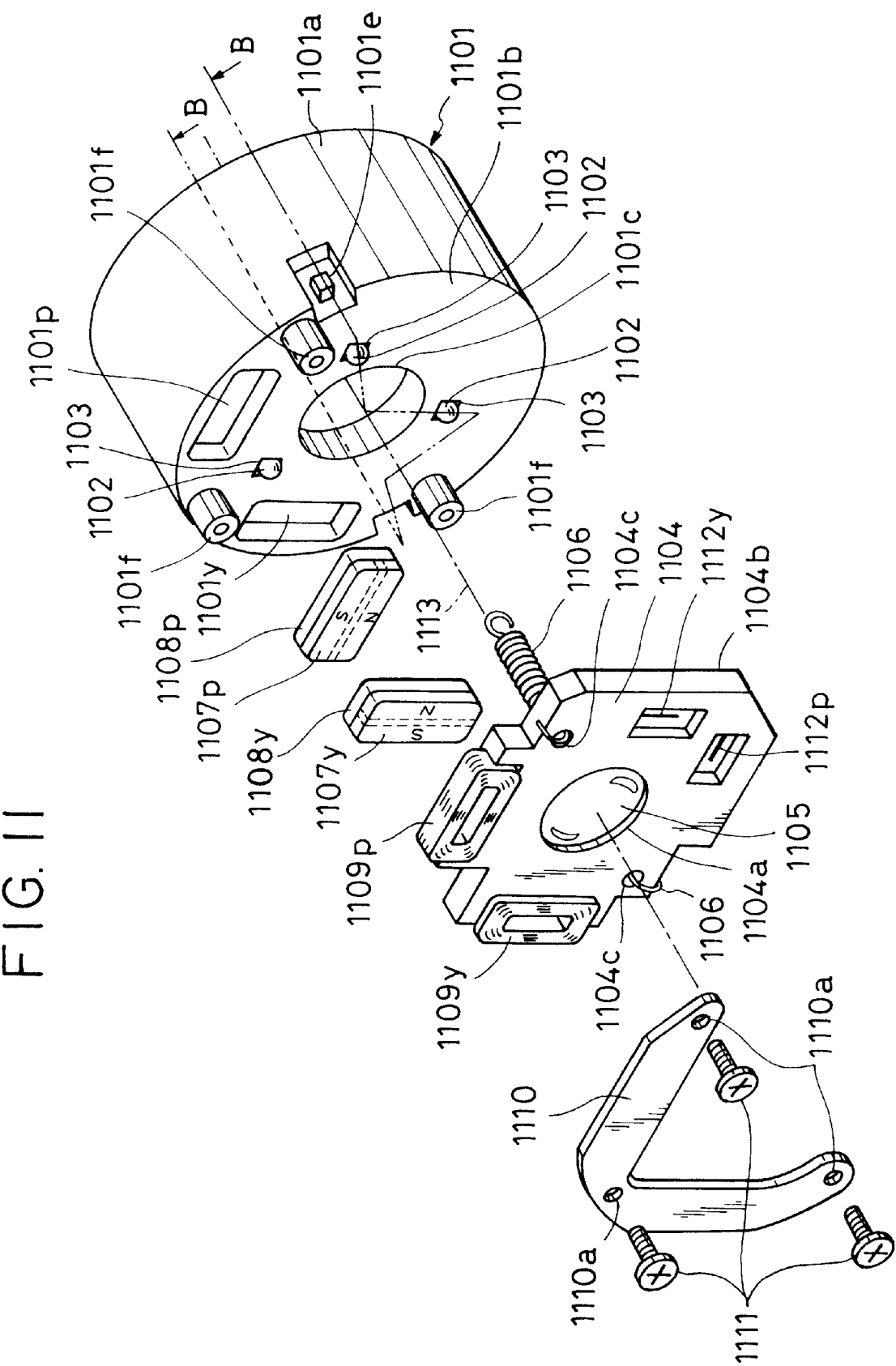
FIG. 11 is an exploded perspective view of a lens shift mechanism of a fifth embodiment of the present invention.
Figure 12:
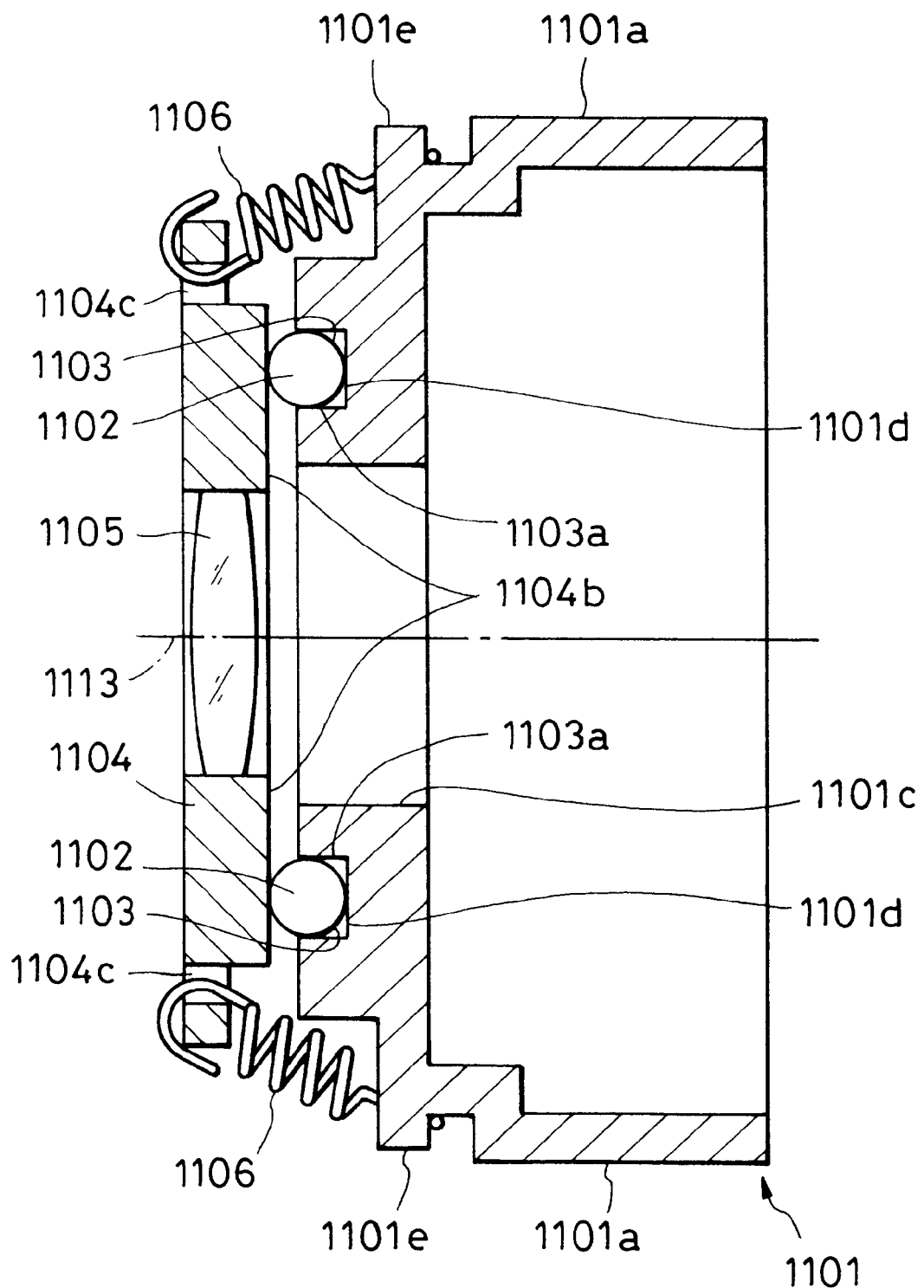
FIG. 12 is a cross-sectional view of the lens shift mechanism taken along a line B—B in FIG. 11.

FIG. 11 is an exploded perspective view of a lens shift mechanism of a fifth embodiment of the present invention and FIG. 12 is a cross-sectional view of the lens shift mechanism taken along a line B—B in FIG. 11. The general construction of the vibration-proof system remains unchanged from that shown in FIG. 10.

Components identical to those described in connection with the fourth embodiments are designated with reference numerals with 100 added to the corresponding reference numerals in FIGS. 8 and 9.

The correction lens shift mechanism is now discussed referring to FIGS. 11 and 12.

A support frame 1101 on its outer circumference 1101a is engaged with an unshown lens barrel and is supported such that the support frame 1101 moves in the direction of the optical axis only. The front end face 1101b of the support frame 1101 has in its center an opening 1101c that allows an image light flux to pass therethrough. Ball holders 1103 are regularly spaced an angle of about 120° apart around the opening 1101c and support three steel balls 1102 in a manner that allows each ball to roll therewithin. The ball holders 1103 hold the respective balls such that the most forward points, in the direction of the optical axis, of the three balls lie in a plane perpendicular to the optical axis and are projected from the front end face 1101b. The ball holders 3 are integrally formed with the support frame 1101 (see FIG. 12).

Reference surfaces 1101d are perpendicular to the optical axis (see FIG. 12), and form the bottom surfaces of the ball holders 1103 so that the three balls 1102 remain reliably in contact therewith. Since the three balls 1102 have the same diameter in the fifth embodiment, the three reference surfaces 1101d lie in the same plane. If the diameters of the balls are set to be different, the reference surfaces 1101d lie in a plurality of different planes. The depth of the ball holders 1103 are greater than the radius of the balls 1102, and reliably hold the balls 1102 so that they may not come off over the side walls 1103a of the ball holders 1103.

A movable frame 1104 has in its center an opening 1104a for holding a correction lens 1105, and on its rear side a surface 1004b which is in parallel with and facing the reference surface 1101d and is in contact with the balls 1102. The surface 1104b has ball seats for engaging with the balls 1102. The ball seats are formed to be wide enough to keep the respective balls therewithin to cover the shift range of the correction lens with a sufficient margin.

Since the most forward points of the three balls in the direction of the optical axis lie in a plane perpendicular to the optical axis in the fifth embodiment, the surface 1104b is one plane. If the most forward points of the three balls do not lie in a plane perpendicular to the optical axis, the surface 1104b is constituted by a plurality of planes perpendicular to the optical axis. In this case as well, each surface 1104b has a ball seat wide enough to keep the ball 1102 therewithin to cover the shift range of the correction lens with a sufficient margin.

An elastic member 1106, namely a tension coil spring, is extended in a modest tension with its rear end anchored at a projected hook 1101e of the support frame 1101 and its front end anchored at a hook hole 1104c formed at the edge of the movable frame 1104. The elastic member 1106 thus pulls the movable frame 1104 outwardly and slantly backwardly with respect to the optical axis. A pair of elastic members 1106 are arranged in diagonally opposite positions, and exert a minimum required force to cause the movable frame 1104 to make the optical axis of the correction lens 1105 coincide with the optical axis of the lens barrel while at the same time restoring the movable frame 1104 to its original position about the optical axis. The pair of elastic members 1106 further exert a minimum pressure to keep the balls in between the rear surface 1104b of the movable frame 1104 and the reference surface 1101d of the support frame 1101.

A pitch magnet 1107p and a pitch yoke 1108p are mounted in a top center slot 1101p of the support frame 1101. A pitch coil 1109p is mounted in the top center of the movable frame 1104. A yaw magnet 1107y and a yaw yoke 1108y are mounted in a side center slot 1101y.

A yaw coil 1109y is mounted in the side center of the movable frame 1104. A front yoke 1110 arranged is common to both yaw and pitch driving. Three screws 1111 passing through three holes 1110a and three mounting arms 1103c of the ball retainer 1103 are screwed into the internal threads of three bosses 1101f on the support frame 1101 to secure the front yoke 1110 and the ball retainer 1103 to the support frame 1101.

The coils 1109p and 1109y have a slight air gap to the magnets 1107p and 1107y and the yoke 1110, and are placed in the magnetic circuit formed by the magnets and yoke. When a current flows through the coil 1109p, the movable frame 1104 is driven in the pitch direction, and when a current flows through the coil 1109y, the movable frame 1104 is driven in the yaw direction. The movable frame 1104 is provided with a pitch slit 1112p and a yaw slit 1112y, and unshown light emitting devices (infrared emitting diodes IREDs) and unshown light receiving devices (semiconductor position sensor devices PSDs) are provided corresponding to the pitch slit 1112p and yaw slit 1112y. With this arrangement, the position of the movable frame 1104 in the pitch direction and yaw direction is detected. Designated 1113 is the optical axis.

Since the movable frame 1104 is supported in parallel with the reference surface 1101d of the support frame 1101 perpendicular to the optical axis, without looseness in the direction of the optical axis, with the balls 1102 interposed therebetween, the movable frame 1104 is shifted in a plane perpendicular to the optical axis 1113. Optical performance of the system resulting from looseness or tilt of the movable frame is thus precluded. Resistance associated with the steel balls 1102 is substantially smaller than the frictional resistance taking place in the sliding motion between a shaft and a bearing; thus, even a small electromagnetic driving force works in the shifting operation of the correction lens.

The pair of elastic members 1106 only, namely tension coil springs only, prevent the movable frame 1104 from rotating about the optical axis while pressing the movable frame 1004 against the balls to preclude looseness in the optical direction during the shifting operation.

Since the ball holders 1103 are integrally formed with the support frame 1101 in the fifth embodiment, the ball holders 1103 need no separate components. Besides the advantages of the fourth embodiment, the fifth embodiment is simply constructed for a reduced cost.

The depth of the ball holders 1103, greater than the radius of the ball 1102, prevents the balls 1102 from coming off over the side walls 1103a of the ball holders. The balls 1102 are thus permitted to roll reliably therewithin.

In the fourth and fifth embodiments, three balls 1102 are employed. Alternatively, more than three balls may be employed.

The ball holders 1103 are integrally formed with the support frame 1101 in the fifth embodiment. Alternatively, the ball holders 1103 may be formed on the movable frame 1104.

In the fourth and fifth embodiments, one pair of elastic members, namely tension coil springs, are employed. Alternatively, three or more tension coil springs may be employed. The elastic member is not limited to the tension coil spring. The same function may be performed by using an urging spring.

As described above, in the fourth and fifth embodiments, the movable frame holding the correction lens is supported by the rolling balls in the reference surface perpendicular to the optical axis. The elastic members restrain the rotation of the movable frame about the optical axis while pressing the movable frame against the balls. With such a simple arrangement, the correction lens is shifted with reduced resistance and without looseness while its position being kept perpendicular to the optical axis.

In the fourth and fifth embodiments, the ball holders are integrally formed with either the support frame or the movable frame. The lens shift mechanism is of a simple construction.

In the fourth and fifth embodiments, the depth of the ball holders, greater than the radius of the ball, helps reliably hold the balls.

The present invention is not limited to the above embodiments. Any arrangement that performs the functions recited in the appended claims and the functions of the above-described embodiment falls within the scope of the present invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The embodiments of the present invention and constituting elements of these embodiments may be used in combination.

The construction of each claim or each of the above embodiments of the present invention, in whole or in part, may form one apparatus or an element of one apparatus or may be combined with another apparatus.

The present invention may be incorporated in a variety of cameras including single-lens-reflex cameras, lens-shutter cameras, video cameras, optical apparatuses excluding cameras, and other apparatuses, and devices for use in the cameras, optical apparatuses and other apparatuses, and elements in these apparatuses.

What claimed is:

1. An image stabilizer for use in an optical apparatus having an optical axis, said image stabilizer comprising:

movable means movable in a plane perpendicular to the optical axis for correcting image blur, said movable means having a first surface perpendicular to the optical axis;

support means for movably supporting said movable means in the plane perpendicular to the optical axis, said support means including a predetermined member having a second surface perpendicular to the optical axis, and a ball arranged between said first surface and said second surface, wherein said support means movably supports said movable means in the plane perpendicular to the optical axis with said ball maintained in rolling contact with said first surface and said second surface; and rotation restraint means for restraining rotation of said movable means about the optical axis, said rotation restraint means comprising a reference member and an intermediate member positioned between said reference member and said movable means.

2. An image stabilizer according to claim 1, wherein said rotation restraint means further comprises a first support mechanism that permits relative movement of said movable means in a first direction between said reference member and said intermediate member, and a second support mechanism that permits a relative movement of said movable means in a second direction, different from the first direction, between said movable means and said intermediate member.

3. An image stabilizer according to claim 2, wherein said first support mechanism comprises a ball interposed between said reference member and said intermediate member, a first ball holder, arranged on one of said reference member and said intermediate member, for holding said ball in a manner that allows the ball to roll therewithin, and a first groove arranged on the other of the said reference member and said intermediate member, at a position facing said first ball holder with said ball therebetween, in a manner that allows said ball to move in said first direction.

4. An image stabilizer according to claim 2, wherein said second support mechanism comprises a ball interposed between said movable means and said intermediate member, a second ball holder, arranged on one of said movable means and said intermediate member, for holding said ball in a manner that allows the ball to roll therewithin, and a second groove arranged on the other one of said movable means and said intermediate member, at a position facing said second ball holder with said ball therebetween, in a manner that allows said ball to move in said second direction.

5. An image stabilizer according to claim 2, wherein said first support mechanism comprises at least three balls interposed between said reference member and said intermediate member.

6. An image stabilizer according to claim 2, wherein said second support mechanism comprises at least three balls interposed between said movable means and said intermediate member.

7. An image stabilizer according to claim 1, wherein said support means, said movable means and said rotation restraint means are stacked in the direction of the optical axis.

8. An image stabilizer according to claim 1, wherein said reference member, said intermediate member and said movable means are stacked in the direction of the optical axis.

9. An image stabilizer according to claim 2, wherein said first support mechanism and said second support mechanism are stacked in the direction of the optical axis.

10. An image stabilizer according to claim 1 further comprising driving means for driving said movable means.

11. An image stabilizer according to claim 10, wherein said driving means is mounted at a position further from said optical axis than said support means is positioned from said optical axis.

12. An image stabilizer according to claim 10, wherein said driving means is mounted at a portion of said movable means which is perpendicular to the optical axis.

13. An image stabilizer according to claim 1, wherein said movable means comprises a correction optical system, said correction optical system having an optical path.

14. An image stabilizer according to claim 13, wherein said first surface is arranged in a perimeter surrounding the optical path of said correction optical system.

15. An image stabilizer for use in an optical apparatus having an optical axis, said image stabilizer comprising:

movable means movable in a plane perpendicular to the optical axis for correcting image blur, said movable means having a first surface perpendicular to the optical axis;

support means for movably supporting said movable means in the plane perpendicular to the optical axis, said support means including a predetermined member having a second surface perpendicular to the optical axis, and a ball arranged between said first surface and said second surface, wherein said support means movably supports said movable means in the plane perpendicular to the optical axis with said ball maintained in rolling contact with said first surface and said second surface; and rotation restraint means for restraining rotation of said movable means about the optical axis, said rotation restraint means comprising first urging means for exerting a force at a first location on said movable means and second urging means for exerting a force at a second location, different from said first location, on said movable means.

16. An image stabilizer according to claim 15, wherein said support means restrains movement of said ball in a direction perpendicular to the optical axis, and comprises a restraint member which is movable relative to said movable means and said predetermined member.

17. An image stabilizer according to claim 16, wherein said restraint means is mounted between said movable means and said predetermined member, and comprises a passageway including a hole which allows said ball to pass therethrough.

18. An image stabilizer according to claim 15, wherein said support means comprises urging force generating means for generating a force that presses said movable means, said ball, and said predetermined member.

19. An image stabilizer according to claim 18, wherein said urging force generating means comprises an elastic member.

20. An image stabilizer according to claim 15, wherein said support means, said movable means and said rotation restraint means are stacked in the direction of the optical axis.

21. An image stabilizer according to claim 15 further comprising driving means for driving said movable means.

22. An image stabilizer according to claim 15, wherein said driving means is mounted at a position further from said optical axis than said support means is positioned from said optical axis.

23. An image stabilizer according to claim 22, wherein said driving means is mounted at a portion of said movable means which is perpendicular to the optical axis.

24. An image stabilizer according to claim 15, wherein said movable means comprises a correction optical system, said correction optical system having an optical path.

25. An image stabilizer according to claim 24, wherein said first surface is arranged in a perimeter surrounding the optical path of said correction optical system.

* * * * *

UNITED STATES PATENT AND TRADEMARK OFFICE
CERTIFICATE OF CORRECTION

PATENT NO. : 6,064,827

DATED : May 16, 2000

INVENTOR(S) : YASUHIRO TOYODA

It is certified that error appears in the above-identified patent and that said Letters Patent is hereby corrected as shown below:

<u>Column 2</u>

Line 40, "the." should read --the--.

<u>Column 6</u>

Line 8, "to" should read --to pass--.

<u>Column 13</u>

Line 62, "(one" should read --(one of--.

UNITED STATES PATENT AND TRADEMARK OFFICE
CERTIFICATE OF CORRECTION

PATENT NO. : 6,064,827

DATED : May 16, 2000

INVENTOR(S) : YASUHIRO TOYODA

It is certified that error appears in the above-identified patent and that said Letters Patent is hereby corrected as shown below:

Column 16

Line 21, "embodiment" should read --embodiments--.

Column 18

Line 60, "embodiments" should read --embodiment--.

Signed and Sealed this

Twenty-second Day of May, 2001

Attest:

NICHOLAS P. GODICI

Attesting Officer        Acting Director of the United States Patent and Trademark Office